(12) United States Patent
Ramos et al.

(10) Patent No.: US 7,636,794 B2
(45) Date of Patent: Dec. 22, 2009

(54) DISTRIBUTED SENSING TECHNIQUES FOR MOBILE DEVICES

(75) Inventors: Gonzalo A. Ramos, Toronto (CA); Kenneth P. Hinckley, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 635 days.

(21) Appl. No.: 11/263,401

(22) Filed: Oct. 31, 2005

(65) Prior Publication Data

US 2007/0124503 A1 May 31, 2007

(51) Int. Cl.
*G06F 15/16* (2006.01)

(52) U.S. Cl. .................................. 709/248; 709/201

(58) Field of Classification Search .............. 709/201, 709/248

See application file for complete search history.

(56) References Cited

U.S. PATENT DOCUMENTS

| | | | | |
|---|---|---|---|---|
| 5,812,865 | A * | 9/1998 | Theimer et al. | 709/228 |
| 5,880,743 | A * | 3/1999 | Moran et al. | 345/473 |
| 6,157,935 | A | 12/2000 | Tran et al. | 715/202 |
| 6,525,749 | B1 * | 2/2003 | Moran et al. | 715/863 |
| 6,545,669 | B1 | 4/2003 | Kinawi et al. | 345/173 |
| 6,599,130 | B2 | 7/2003 | Moehrle | 434/365 |
| 7,006,881 | B1 * | 2/2006 | Hoffberg et al. | 700/83 |
| 7,162,509 | B2 * | 1/2007 | Brown et al. | 709/201 |
| 7,200,530 | B2 * | 4/2007 | Brown et al. | 703/1 |
| 7,200,559 | B2 | 4/2007 | Wang | 704/257 |
| 7,308,273 | B2 | 12/2007 | Zhang | 455/456.1 |
| 7,336,928 | B2 | 2/2008 | Paalasmaa et al. | 455/41.2 |
| 7,512,889 | B2 * | 3/2009 | Newell et al. | 715/741 |
| 7,533,189 | B2 * | 5/2009 | Mahajan et al. | 709/248 |
| 2002/0107008 | A1 | 8/2002 | Hendrey et al. | 455/416 |
| 2002/0116205 | A1 * | 8/2002 | Ankireddipally et al. | 705/1 |
| 2002/0184373 | A1 * | 12/2002 | Maes | 709/228 |
| 2003/0105812 | A1 * | 6/2003 | Flowers et al. | 709/203 |
| 2003/0145094 | A1 * | 7/2003 | Staamann et al. | 709/229 |
| 2003/0222917 | A1 | 12/2003 | Trantow | 345/778 |
| 2005/0030255 | A1 * | 2/2005 | Chiu et al. | 345/1.3 |
| 2005/0165795 | A1 | 7/2005 | Myka et al. | 707/100 |
| 2006/0004834 | A1 | 1/2006 | Pyhalammi et al. | 707/102 |
| 2006/0046709 | A1 * | 3/2006 | Krumm et al. | 455/422.1 |
| 2007/0123235 | A1 | 5/2007 | Newport et al. | 455/414.2 |

OTHER PUBLICATIONS

Rekimoto et al., J., "SyncTap: An Interaction Technique for Mobile Networking", *New Generation of IP-Phone Enabled Mobile Devices*, Mobile HCI 2002, pp. 319-323, 2002.

Hinckley et al., K., "Stitching: Pen Gestures that Span Multiple Displays", http://patrickbaudish.com/publications/2004-Hinckley-AV104-Stitching.pdf, Oct. 6, 2003.

Hinckley, K., "Bumping Object Together as a Semantically Rich Way Forming Connections between Ubiquitous Devices", UbiComp 2003 conference, Oct. 12, 2003.

(Continued)

*Primary Examiner*—Firmin Backer
*Assistant Examiner*—Jonathan Bui
(74) *Attorney, Agent, or Firm*—Westman, Champin & Kelly, P.A.

(57) ABSTRACT

Methods and apparatus of the various embodiments allow the coordination of resources of devices to jointly execute tasks or perform actions on one of the devices. In the method, a first gesture input is received at a first mobile computing device. A second gesture input is received at a second mobile computing device. In response, a determination is made as to whether the second gesture is accepted at the initiating device. If it is determined that the second gesture inputs is accepted, then resources of the devices are combined to jointly execute a particular task associated with the shared resources.

19 Claims, 17 Drawing Sheets

OTHER PUBLICATIONS

Hinckley, K., "Synchronous Gestures for Multiple Persons and Computer", Proceedings of the 16$^{th}$ Annual ACM Symposium on User Interface Software and Technology, Vancouver, Canada, pp. 149-158, Nov. 2-5, 2003.

Hinckley, K., Distributed and Local Sensing Techniques for Face-to-Face Collaboration (Short Paper), Proceedings of the 5$^{th}$ International Conference on Multimodal Interfaces, Vancouver, British Columbia, Canada, p. 81-84, Nov. 3-5, 2003.

* cited by examiner

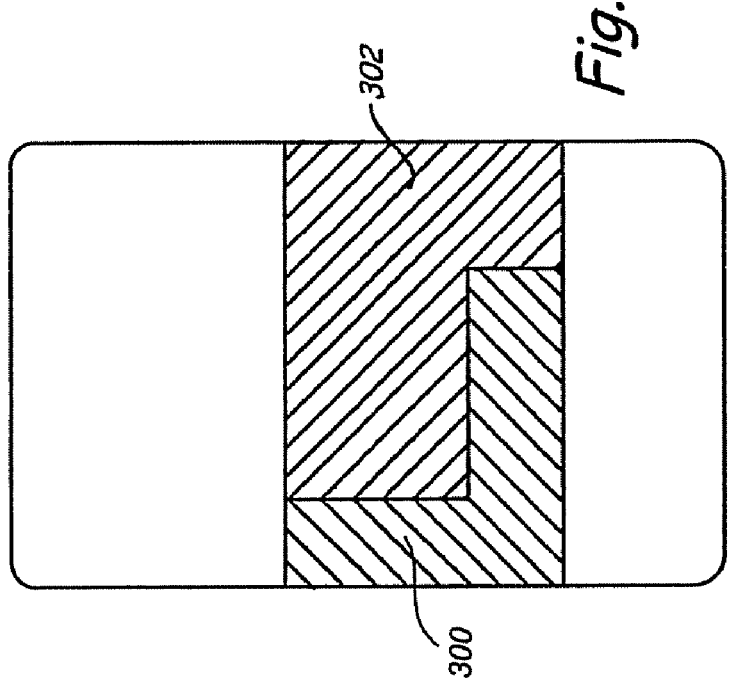
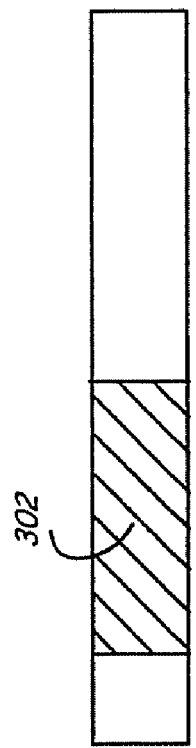
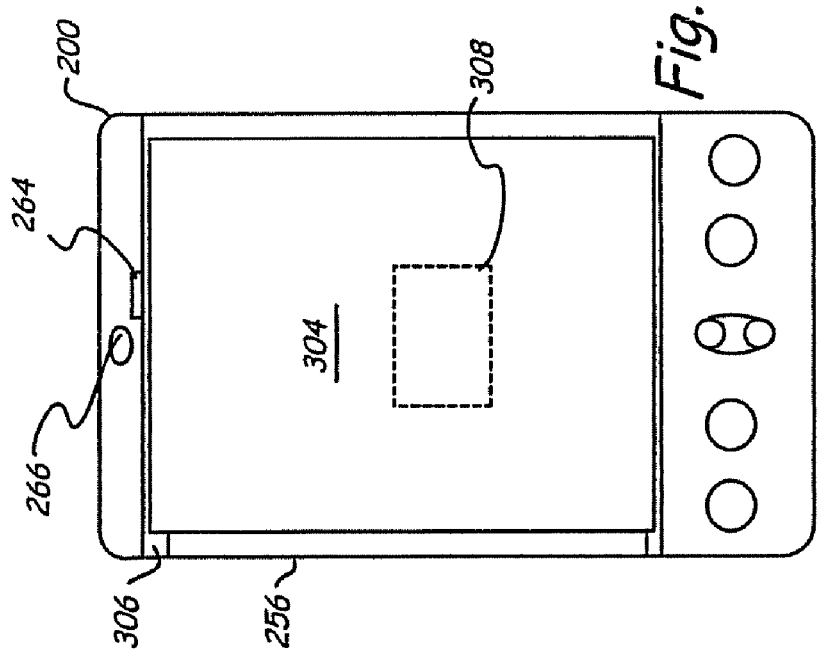
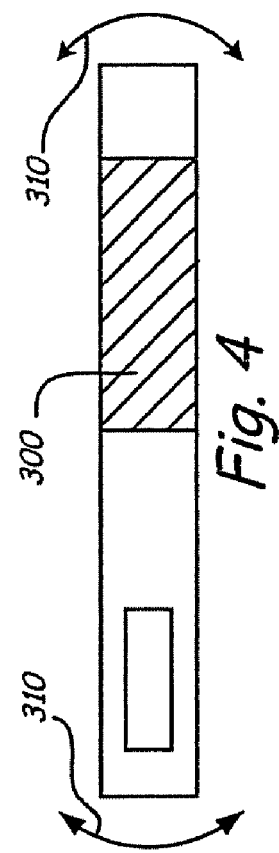

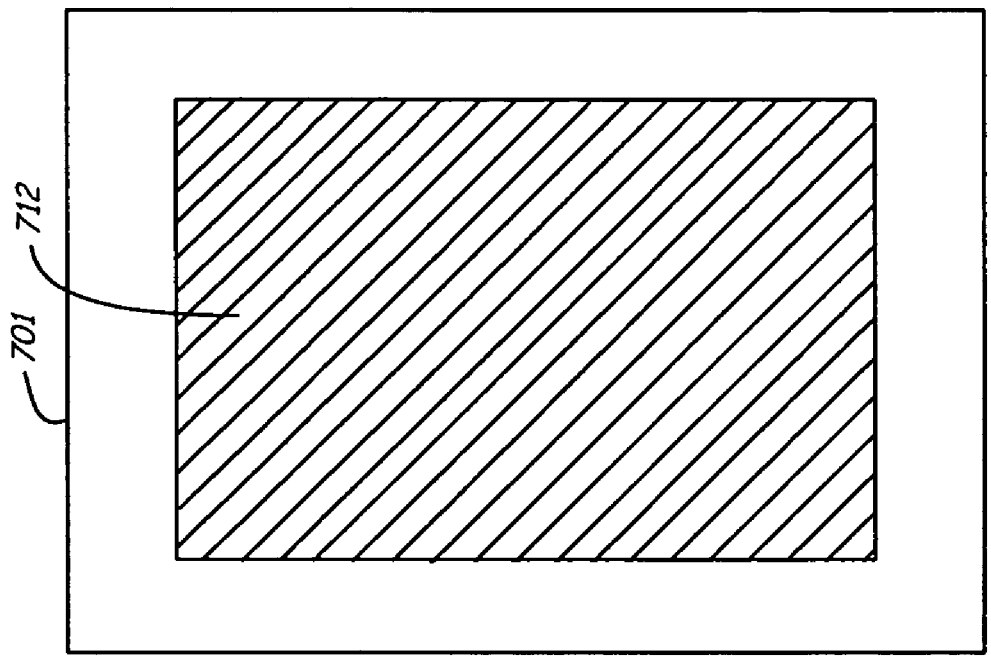
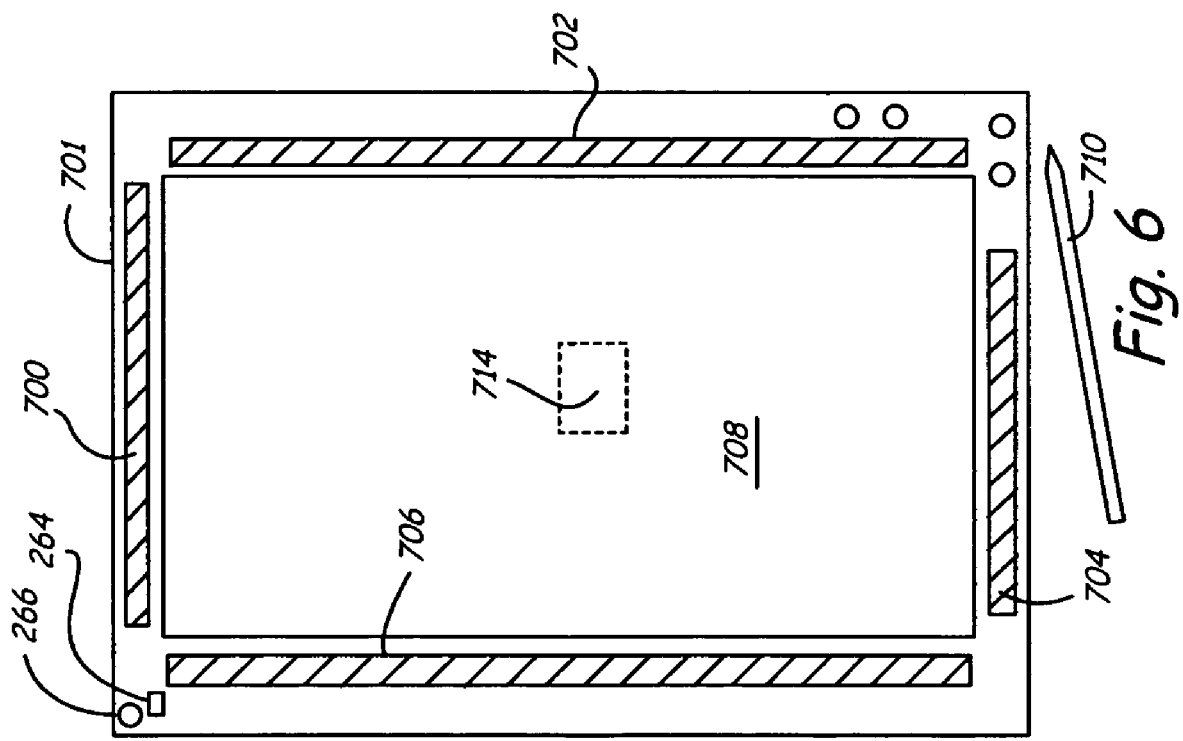

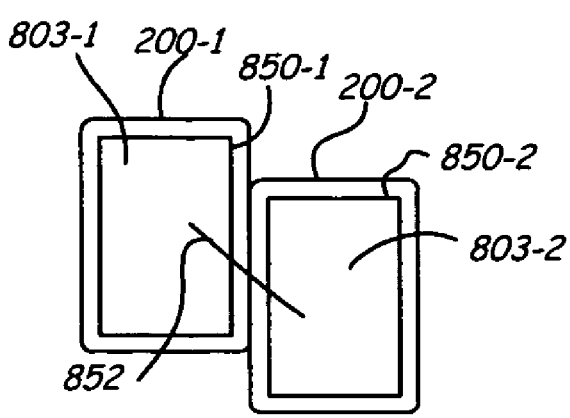
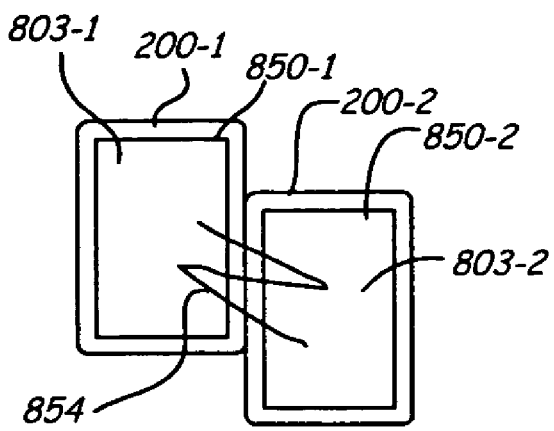
Fig. 11-1  Fig. 11-2
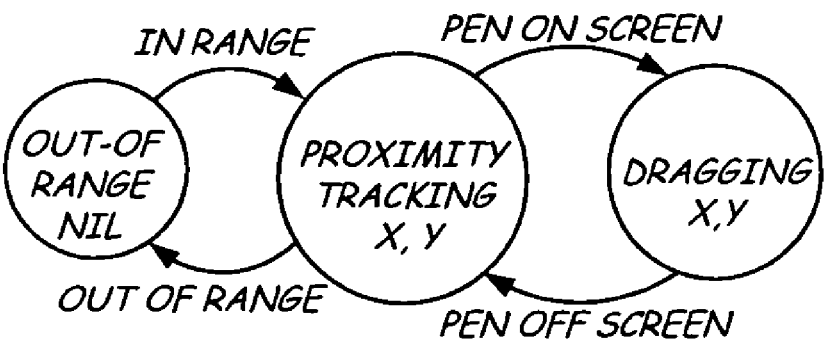
Fig. 11-3
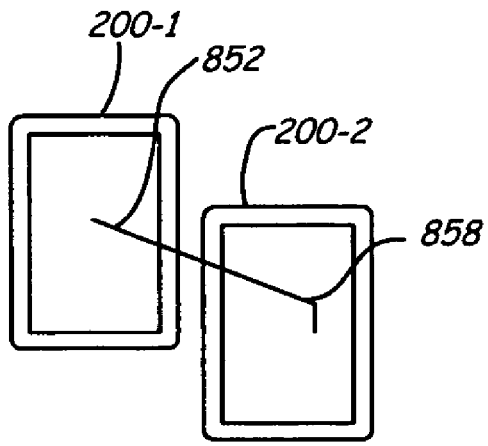
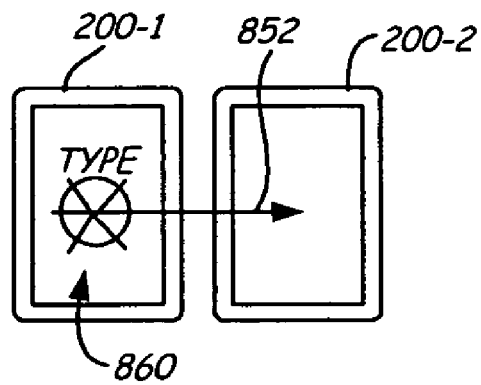
Fig. 12-1  Fig. 12-2

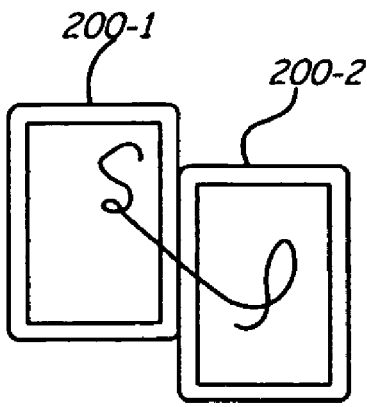 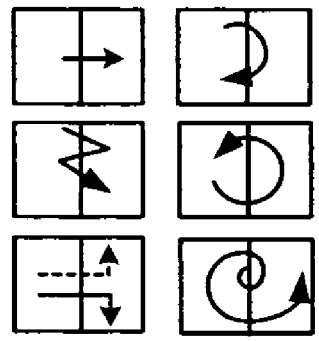
Fig. 13-1          Fig. 13-2
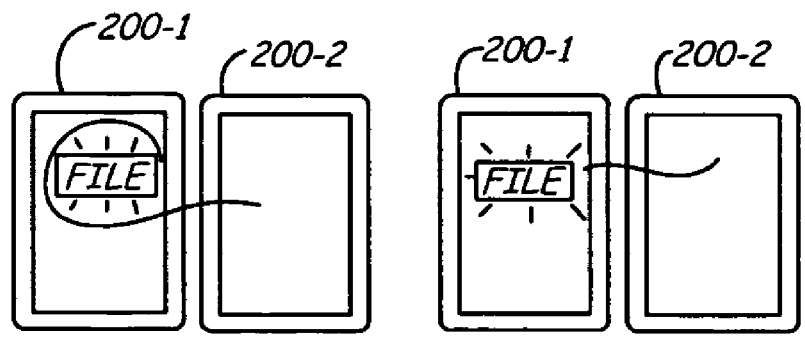
Fig. 14-1          Fig. 14-2
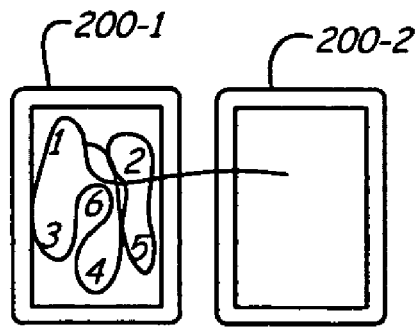
Fig. 15

DISTRIBUTED SENSING TECHNIQUES FOR MOBILE DEVICES

BACKGROUND

The discussion above is merely provided for general background information and is not intended to be used as an aid in determining the scope of the claimed subject matter.

Mobile devices, such as personal information managers (PIMs), tablet PCs, cellular telephones, pagers, watches, and wearable computers typically include one or more buttons, touch screens, or active digitizers through which the mobile device receives explicit instructions from the user. Increasingly, mobile devices are being connected together via a wireless or wired network for purposes of communication, sharing of data and collaborative work.

Humans have evolved to function within a fabric of social connections and collaboration. People work on problems in groups, and indeed the entire field of computer-supported collaborative work (CSCW) is devoted to technological support of such groups. Many user tasks and activities revolve around communication, which inherently involves at least two persons. Furthermore, with the burgeoning use of the internet, and research trends in ubiquitous computing and distributed systems, human-computer interaction often involves more than one computer. Yet there are few examples of real-time interaction techniques that leverage the simultaneous data streams generated by multiple users and multiple computers.

Establishing meaningful connections between devices is a problem of increasing practical concern for ubiquitous computing. Wireless networking and location sensing can allow devices to communicate and may provide information about proximity of other devices. However, with many devices nearby, how a user specifies which devices to connect to remains a problem. Furthermore, connections require semantics: What is the connection for? Is the user collaborating with another user? Is the user combining the input/output resources of multiple devices to provide increased capabilities? Presently, there exists a lack of techniques to intuitively form semantically rich connections between devices.

There are also relatively few techniques for forming distinguished connections between multiple devices. One prior art technique is "Smart-Its Friends", which is described in the paper Holmquist et al., *Smart-Its Friends: A Technique for Users toEasily Establish Connections between Smart Artefacts*, Ubicomp 2001, Springer-Verlag, 116-122. Smart-Its Friends allows a user to connect a pair of accelerometer-augmented handheld devices by holding the two devices together and shaking them. An identical pattern on the accelerometers suggests a shared context between the devices. The paper suggests using this to form a dedicated connection between the two shaken devices: if a "friend" device enters or leaves proximity, the user's device beeps, thus creating "a sense of awareness" of the comings and goings other users. One problem with Smart-Its Friends is that only this one type of connection can be formed.

Another prior art technique for forming distinguished connections between multiple devices is "ConnecTables," which is described in the paper Tandler et al., *ConnecTables: dynamic coupling of displays for the flexible creation of shared workspaces*, UIST 2001, 11-20. ConnecTables are wheeled tables with mounted LCD displays that can be rolled together so that the top edges of two LCD's meet. The devices then recognize one another through a radio frequency identification (RFID) tag and RFID reader mounted on each device. The displays can only be joined at the top edge (i.e., when they face one another). When joined, two ConnecTables create a shared workspace in which users can pass objects back and forth. With ConnecTables, other types of connections between the two display devices are not supported. Further, since the displays are part of the furniture and cannot be picked up, fluid transitions between shared work and private or semi-private work is not possible.

Much recent discussion has focused on the promise of the wireless internet, yet there has been relatively little work on techniques that help users of mobile devices to collaborate with others and to share information with other persons. For example, when attempting to copy a file between mobile devices, it remains difficult for users to name a device to connect to, specify how to connect, or indicate what information to share.

SUMMARY OF THE VARIOUS EMBODIMENTS

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods and apparatus of the various embodiments allow the coordination of resources of devices to jointly execute tasks or perform actions on one of the devices. In the method, a first gesture input is received at a first mobile computing device. A second gesture input is received at a second mobile computing device. In response, a determination is made as to whether the second gesture is accepted at the initiating device. If it is determined that the second gesture inputs is accepted, then resources of the devices are combined to jointly execute a particular task associated with the shared resources.

BRIEF DESCRIPTION OF THE DRAWINGS

FIG. 2 is a front view of the mobile device of FIG. 2.

FIG. 3 is a back view of the mobile device of FIG. 1.

FIG. 4 is a left side view of the mobile device of FIG. 1.

FIG. 5 is a right side view of the mobile device of FIG. 1.

FIG. 6 is a front view of a second embodiment of a mobile device.

FIG. 7 is a back view of the mobile device of FIG. 6.

FIGS. 10-1 through 10-7 are diagrammatic illustrations of various features of some embodiments of the various embodiments.

FIGS. 11-1 and 11-2 are diagrammatic illustrations of stitching type synchronous gestures.

FIG. 11-3 is a three state model of a pen or stylus input with proximity tracking.

FIGS. 12-1 through 15 are diagrammatic illustrations of stitching type synchronous gestures and related tasks or features.

DETAILED DESCRIPTION OF THE PREFERRED EMBODIMENTS

The various embodiments include distributed sensing techniques for mobile devices and other computer devices using "synchronous gestures." Synchronous gestures are patterns of activity, contributed by multiple users (or one user with multiple devices), which span a distributed system and take on a new meaning when they occur together in time. These patterns can occur in parallel and in exact synchrony, or they can be partially overlapped or occur in a particular sequence. In general, in synchronous gestures the complementary portions of a signal are contributed by different devices or participants, and the signal cannot easily be recognized until the disparate portions are brought together and analyzed as a whole.

The various embodiments are particularly beneficial with tablet computers or other mobile devices that can communicate with one another (for example using wireless networks, peer-to-peer radio frequency communication, or other means of establishing communication between a plurality of devices). In some embodiments appropriate sensors are added to traditional mobile devices in order to detect the synchronous gestures. The following description of example embodiments of the various embodiments discusses various sensor types, as well as various distributed sensor patterns which can be used to generate the synchronous gestures.

Figure 1:
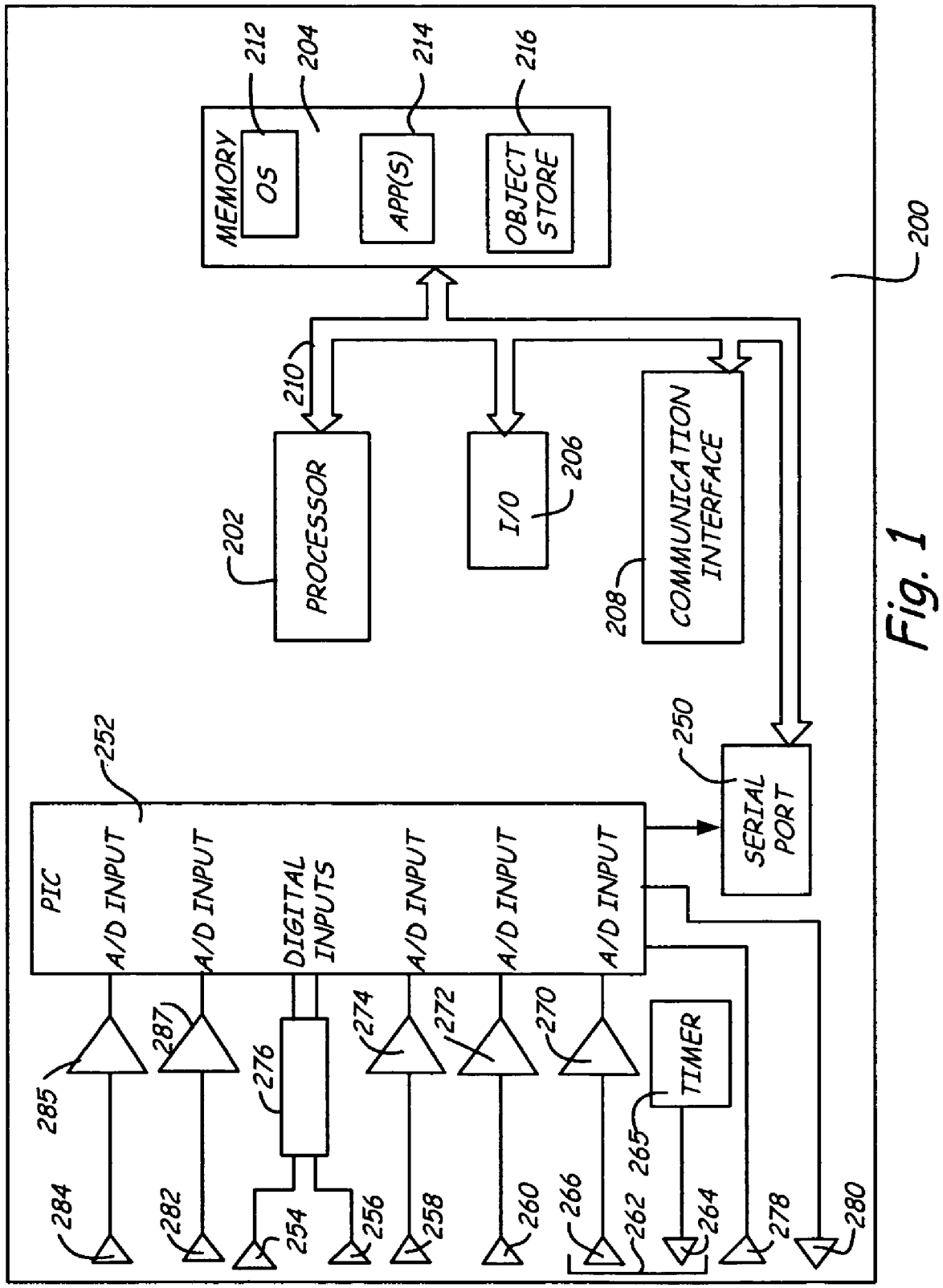
FIG. 1 is a block diagram of the components of a mobile device under one embodiment of the various embodiments.

FIG. 1 is a block diagram of a mobile device 200, which is an exemplary environment for embodiments of the various embodiments. Mobile device 200 includes a microprocessor 202, memory 204, input/output (I/O) components 206, and a communication interface 208 for communicating with remote computers or other mobile devices. In one embodiment, the aforementioned components are coupled for communication with one another over a suitable bus 210.

Memory 204 is a computer readable media, which can be any available media that can be accessed by processor 202 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, TOM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by processor 202. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The particular computer readable medium used in a mobile device is a function of the size of the device and the power capacity of the device. For example, a tablet PC will typically include one or more disk drives where as a PIM will typically only include a random access memory (RAM) with a battery back-up module (not shown) such that information stored in memory 204 is not lost when the general power to mobile device 200 is shut down.

A portion of memory 204 is preferably allocated as addressable memory for program execution, while another portion of memory 204 is preferably used for storage.

Memory 204 includes an operating system 212, application programs 214, and an object store 216. During operation, operating system 212 is preferably executed by processor 202 from memory 204. Operating system 212, in one preferred embodiment, is a WINDOWS® CE brand operating system commercially available from Microsoft Corporation. In Tablet PC embodiments, Windows® XP brand operating system available from Microsoft Corporation is utilized. Operating system 212 is preferably designed for mobile devices, and implements database features that can be utilized by applications 214 through a set of exposed application programming interfaces and methods. The objects in object store 216 are maintained by applications 214 and operating system 212 at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial, parallel, USB, or Firewire communication connection, all of which are capable of transmitting streaming information.

Input/output components 206 include a variety of input devices that have previously been found on mobile devices such as a touch-sensitive screen or transparent tablet overlay sensitive to properties of a special stylus including position, proximity to the screen, pressure, azimuth, elevation, which end of the stylus is being used (e.g. writing tip on one end, eraser on the other end) and possibly a unique ID encoded in the stylus, buttons, rollers, and a microphone as well as a variety of output devices including an audio generator, a vibrating device, and a display. The devices listed above are by way of example and need not all be present on mobile device 200.

Mobile device 200 also includes additional input devices under the various embodiments. Under one embodiment, these input devices are connected to the mobile device through a separate serial port 250 and a peripheral interface controller (PIC) microprocessor 252. In other embodiments, these additional devices are connected to processor 202 through communication interface 208 and PIC microprocessor 252 or through PIC microprocessor 252 directly. Under one embodiment, a microchip 16F877 peripheral interface controller is used as the PIC microprocessor. In still further embodiments, PIC microprocessor 252 is not present and the input devices are connected to processor 202 through various ports such as serial port 250 or through communication interface 208, or through memory-mapped I/O or direct connection to the system processor(s).

Under the embodiment of FIG. 1, the additional input devices include a set of touch sensors such as touch sensors 254 and 256 which identify when a user is holding mobile device 200. Touch sensors 254 and 256 are provided to a separate peripheral interface controller microprocessor 276 which converts the touch signals into digital values and provides the digital values to PIC microprocessor 252. In other embodiments, touch sensors 254 and 256 are connected directly to analog or digital inputs in PIC microprocessor 252 instead of being connected to PIC 276 or are connected to processor 202.

The input devices also include a dual axis linear accelerometer tilt sensor 258 capable of detecting forward/back tilt, left/right tilt, and linear accelerations such as those resulting from vibrations or movement.

The input devices also optionally include one or more of a light sensor 260, a proximity sensor 262 consisting of an infrared transmitter 264 and an infrared receiver 266, a digital compass (e.g. a single or multiple axis magnetometer) 284, and a gravity switch 282. The sensing signals from the infrared receiver 266, linear accelerator 258, light sensor 260, digital compass 284, and gravity switch 282 may be provided through respective amplifiers 270, 272, 274, 285 and 287 to analog inputs of PIC microprocessor 252. These analog inputs are connected to analog-to-digital converters within PIC microprocessor 252. In other embodiments, the sensors provide a digital output and thus are connected to digital inputs on the microprocessor. In further embodiments, the input devices also include a temperature sensor.

PIC microprocessor 252 also includes a connection to the power bus of mobile device 200, which is shown as connection 278 in FIG. 1. PIC microprocessor 252 also includes a connection to a power switch 280, which enables PIC microprocessor 252 to turn mobile device 200 on and off. Note that PIC microprocessor 252 always receives power and, under one embodiment, is able to control which of the sensors receives power at any one time. This allows PIC microprocessor 252 to manage power consumption by only sending power to those sensors that it anticipates will need to be active.

Under one embodiment, PIC microprocessor 252 continuously samples the sensors and transmits packets representing the state of these sensors at a rate of approximately 400 samples per second through serial port 250. In some embodiments, samples are reported at lower speeds to conserve power and processing resources. Some sensors may be reported at different sampling rates than others (e.g. tilt may be updated more frequently than touch).

Figures 1, 10:
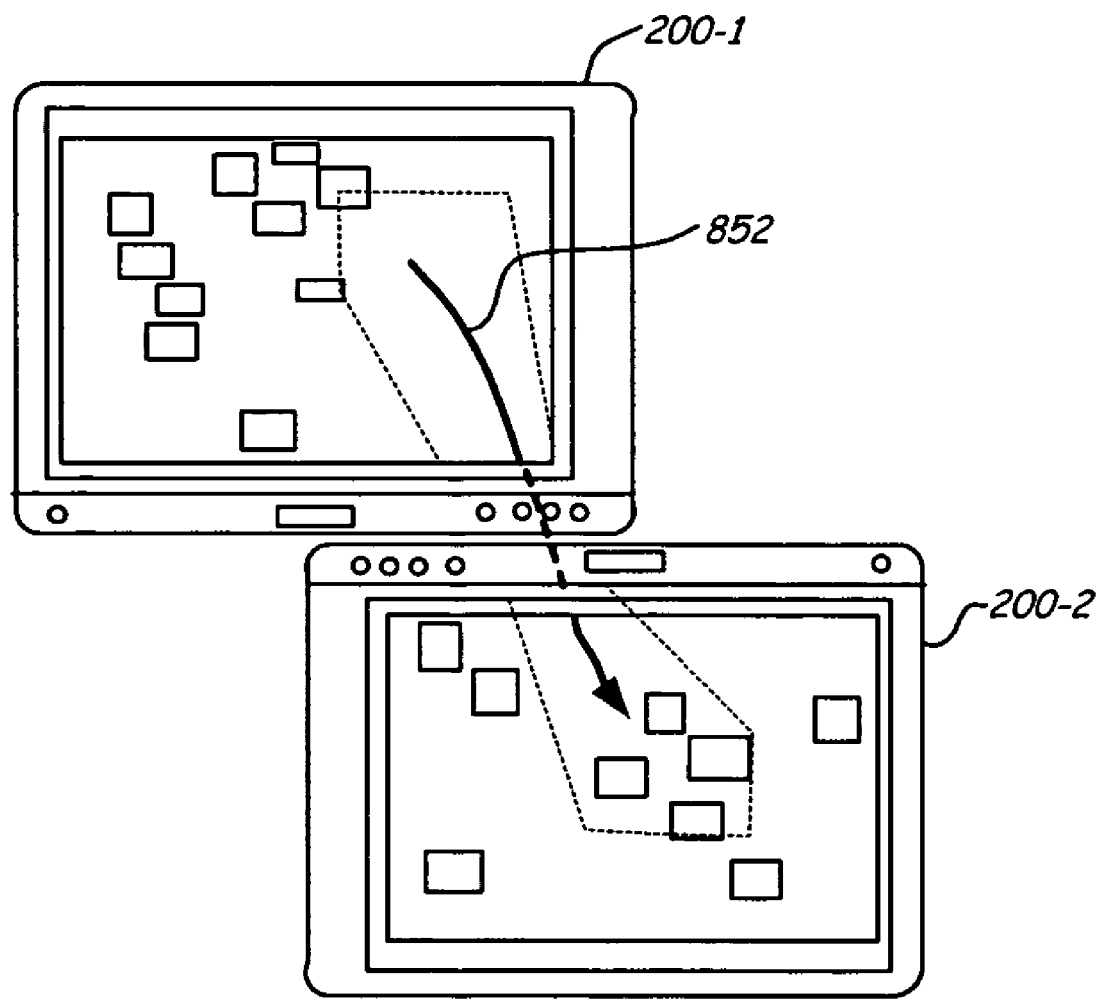

Under one embodiment, the touch sensors are conductive or capacitive touch sensors that are divided into two regions. In other embodiments, these sensors are implemented as a single detector pad. Under one embodiment, the touch sensors are spread across the back and sides of mobile device 200. This is shown in more detail in FIGS. 3-5 which show a back, left side view and right side view of the outside of mobile device 200. In FIGS. 3, 4, and 5, touch sensor 254 is shown as two regions 300 and 302. Region 300 extends from the left side to the back of mobile device 200 and region 302 extends from the right side to the back of mobile device 200. When a user touches either section 300 or 302, the capacitance associated with the touched section changes indicating that the user has touched the device. Note that although the touch sensors are shown on the exterior of the device in the embodiment of FIGS. 3-5, in other embodiments, the touch sensor is located beneath an outer covering of the device.

Figures 2, 10:
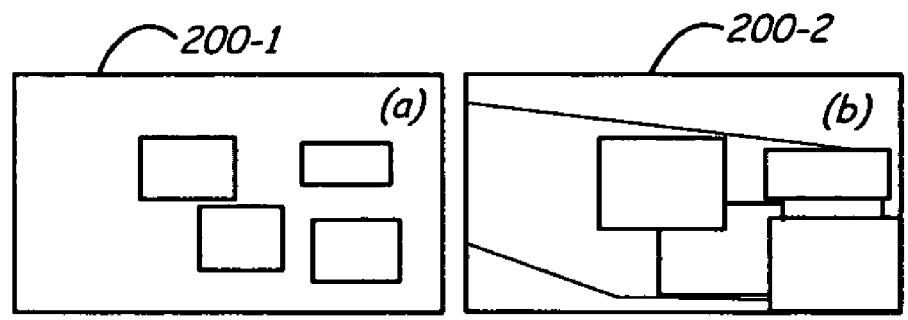
Figures 3, 10:
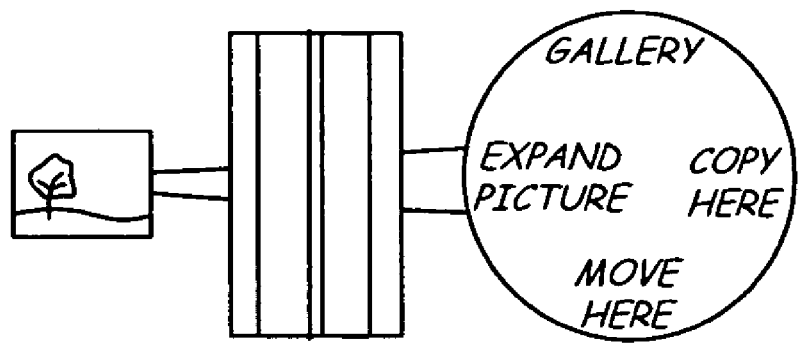
Figures 4, 10:
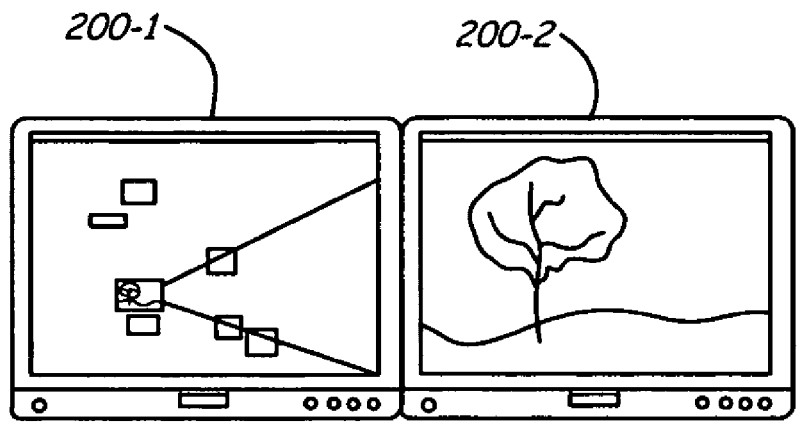
Figures 5, 10:
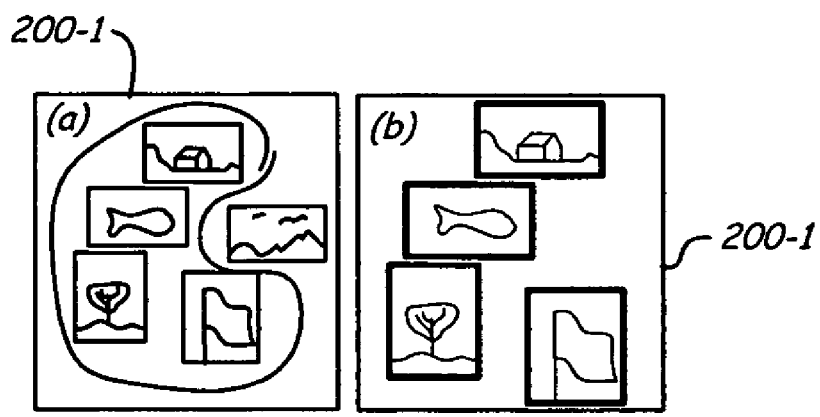

Touch sensor 256 is shown in FIG. 2, which is a front view of mobile device 200. In the embodiment of FIG. 2, touch sensor 256 is located on the left bezel of display screen 304. In other embodiments, touch sensor 256 is located on the outer casing on the front portion of mobile device 200, but not necessarily on bezel 306 of mobile device 200.

In some embodiments, the touch sensors described above are realized using a plurality of independent touch sensors that each provides a separate touch signal. In other embodiments, the touch sensors are replaced with position sensors that indicate the location where the user is touching the device. Those skilled in the art will recognize that additional touch sensors may be added to the mobile device within the scope of the various embodiments.

Figures 6, 10:
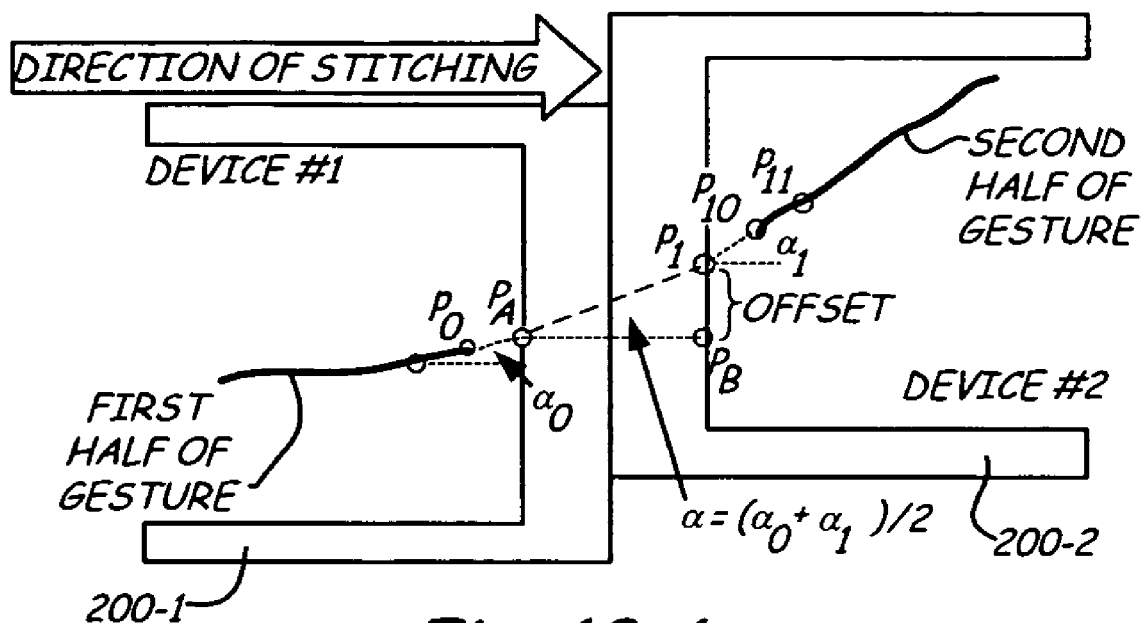
Figures 7, 10:
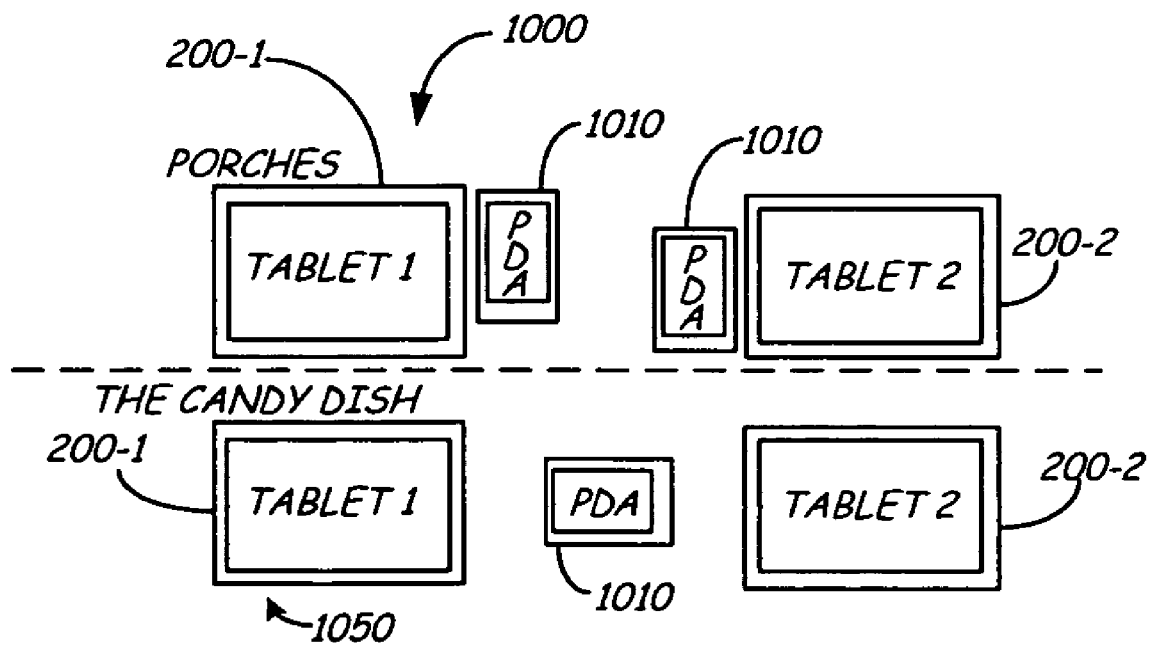

FIGS. 6 and 7 indicate locations for touch sensors under one embodiment of a tablet PC. In FIG. 6, touch sensors 700, 702, 704, and 706 are located at various locations around the perimeter of a display 708 on the front of tablet PC 701. Sensors associated with display 708 are able to detect the location of a stylus 710 when it is near display 708 using inductive coupling between display 708 and conductors in stylus 710. Under some embodiments, the sensors associated with display 708 are able to detect the proximity of stylus 710 as well as the azimuth of the stylus.

FIG. 7 provides a back view of tablet PC 701 and shows a touch sensor 712 located on the back surface of the tablet PC.

Tablet PC 701 can be of a slate form, in which the tablet PC only includes the display for input and does not include a keyboard. The slate forms of the tablet PC can be used with a docking station to provide a connection to other input devices and memory devices.

In other embodiments, the tablet PC is a convertible device with a keyboard. Under one convertible embodiment, the keyboard is attached to the display through a pivoting connection that allows the tablet PC to be in either a closed state or an open state. In such embodiments, the display is embedded in a top portion of the tablet PC and the keyboard is embedded in a bottom portion of the tablet PC. In the closed state, the top and bottom portions of the tablet PC are brought together so that the keyboard is hidden between the top and bottom portions while the display is visible on the exterior of the top portion. In the open state, the display pivots so that it faces the keyboard.

In another convertible embodiment, the display portion of the tablet PC is detachable from a keyboard and extended device portion, which can contain various disk drives and additional memory. In such embodiments, the back touch sensor 712 can be located on the back of the display portion or on the back of the keyboard portion.

Tilt sensor 258 is shown as a single dotted element 308 in FIG. 2 and element 714 in FIG. 6. The tilt sensor is embedded within the casing of mobile device 200 and 701 and in one embodiment is located at a point about which users typically pivot mobile device 200 and 701 when tilting the device. Note that the tilt sensor's position within the mobile device is unimportant as it senses only the angle of its physical attitude with respect to gravity.

Under one embodiment, an Analog Devices ADXL202JE two-axis linear accelerometer is used for tilt sensor 258. Such a sensor detects forward/backward tilt, shown by arrows 310 of FIG. 4, and left/right tilt, shown in the bottom view of FIG. 2 as arrows 312. The sensor also responds to linear accelerations, such as those resulting from shaking the device, vibrations, or other movement, within ±2 units of Earth's gravity, enabling the system to detect vibrations and hard contact forces. Hard contact forces can cause sharp spikes in the accelerometer data. In an example embodiment, the system maintains a sampling rate of approximately 120 Hz to reliably sense the direction and magnitude of such spikes. In one implementation embodiment, the duty cycle period of the accelerometer is set to 1 ms for quick sampling, and the sampling bandwidth is set to 10 Hz. This helps to smear out sharp spikes over time, making them detectable at a modest sampling rate, while removing undesired high frequencies from the signal.

Typically, the tilt sensor has a response curve both in the forward/back direction and left/right direction with the form:

$$\text{Angle} = \sin^{-1}\left(\frac{T - T_c}{k}\right) \qquad \text{EQ. 1}$$

where T is the tilt sensor value, $T_c$ is the sensor value at 0° tilt, and k is a gain parameter.

In embodiments where the sensor cannot detect the sign of the gravity vector, it is unable to determine if the user is holding the device with the display facing up or down. Gravity switch 282 of FIG. 1 is thus provided in some embodiments to indicate whether the display is facing the ground. In other embodiments, a three-axis accelerometer is used to provide the sign of the gravity vector.

In addition, the tilt sensor does not respond to rotation about an axis running from the front to the back of the mobile device. Thus, the tilt sensor is unable to sense the spinning of the mobile device on its back when laid on a flat table. Digital magnetic compass 284 of FIG. 1 is thus provided in some embodiments to indicate this type of rotation. In other embodiments, solid state gyros are used instead of the compass. In further embodiments, a multiple axis magnetometer may be used in lieu of the digital compass, and combined with the tilt sensor values, to improve the robustness of the sensed compass direction.

When present, gravity switch 282 and digital compass 284 are also internal to mobile devices 200 and 701. They are not shown in FIGS. 2 and 6 to reduce the complexity of FIGS. 2 and 6.

Note that the additional input devices of FIG. 1 do not all have to be present in various embodiments. Different embodiments of the various embodiments will use different numbers of and different combinations of these additional sensors. Further, additional sensors may be added without affecting the functions of the sensors discussed in the present application.

Transmitter 264 and receiver 266 of proximity sensor 262 are shown in FIGS. 2 and 6. In the embodiment of FIG. 2, transmitter 264 is shown below and to the right of receiver 266, and both the transmitter and receiver are located at the top front of mobile device 200.

Under one embodiment, a timer 265 drives transmitter 264 at 40 kilohertz and transmitter 264 is an infrared light emitting diode with a 60° beam angle. Under such embodiments, receiver 266 is also an infrared receiver that is capable of operating at the same frequency as transmitter 264. The light produced by transmitter 264 bounces off objects that are near mobile device 200 and the reflected light is received by receiver 266. Receiver 266 typically has an automatic gain control such that the strength of the received signal is proportional to the distance to the object. In a further embodiment, multiple light emitting diodes with different beam angles may be combined to improve sensor response to both distant objects (using a narrow collimated beam angle, e.g. 5°) as well as objects that are not directly in front of the sensor (using a wide beam angle).

The mobile devices 200 and 701 shown in FIGS. 1-7 are examples of mobile devices having sensors which can be used to recognize a synchronous gesture between two mobile devices. However, the various embodiments is not limited to use with mobile devices having the particular sensors and/or configurations shown in these FIGS., but rather, these FIGS. provide examples of suitable mobile devices.

Figure 8:
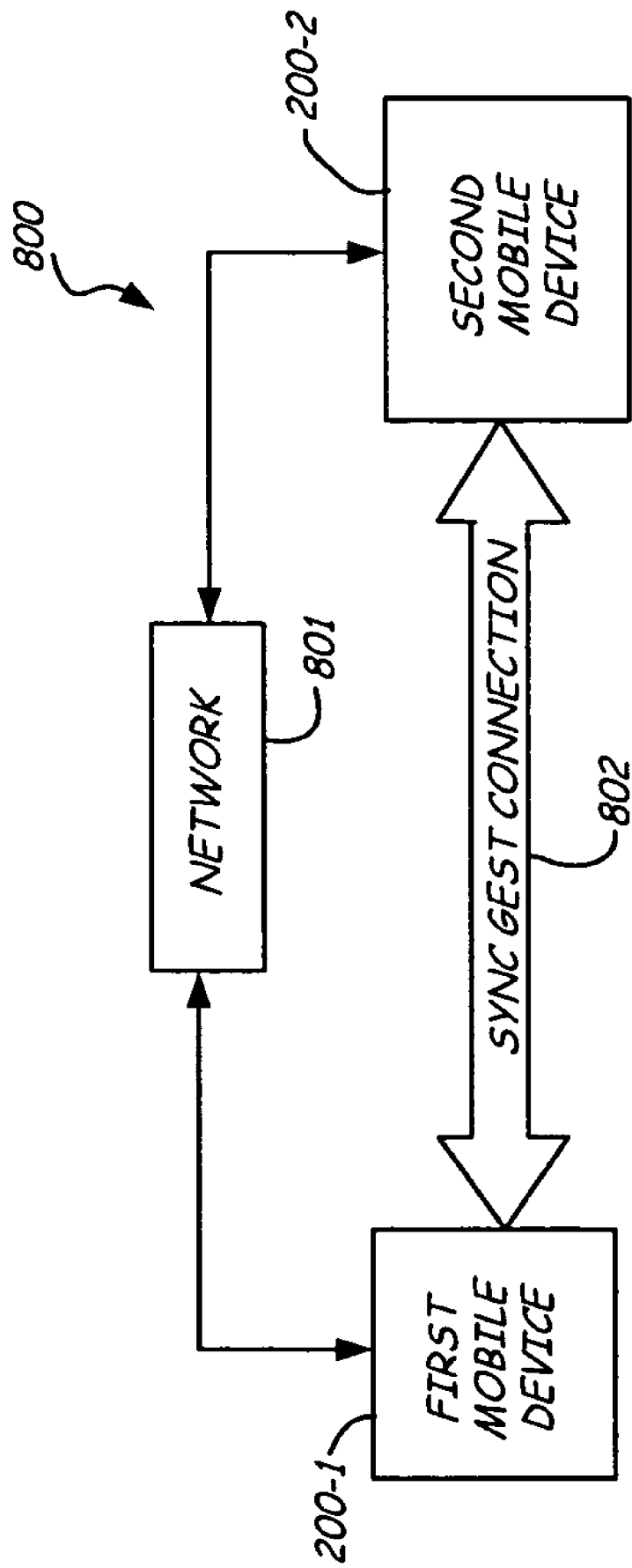
FIG. 8 is a block diagram of a system including two mobile device configured to recognize synchronous gestures and to establish a connection to jointly accomplish a task defined by the synchronous gesture.

FIG. 8 is a block diagram illustrating a system 800 including a first mobile device 200-1, a second mobile device 200-2, and a network 801. However, various embodiments can be pertained on other types of devices, such as a desktop computer. The mobile devices can be, for example, tablet PC's (tablets) or other suitably configured mobile computers. The network 801 can be a wired or wireless network. While in a typical environment network 801 would provide communications between a larger number of computing devices, in some embodiments network 801 can provide communications exclusively between mobile devices 200-1 and 200-2. As illustrated in FIG. 8, in system 800 a "synchronous gesture connection" 802 exists between the mobile devices. As used herein, a "synchronous gesture connection" means that a connection for purposes of jointly executing a particular task has been established. The synchronous gesture connection is established, typically over network 801, upon the detection of a synchronous gesture. Detection of a synchronous gesture involves detection of complementary portions of a signal at devices 200-1 and 200-2.

Figure 9:
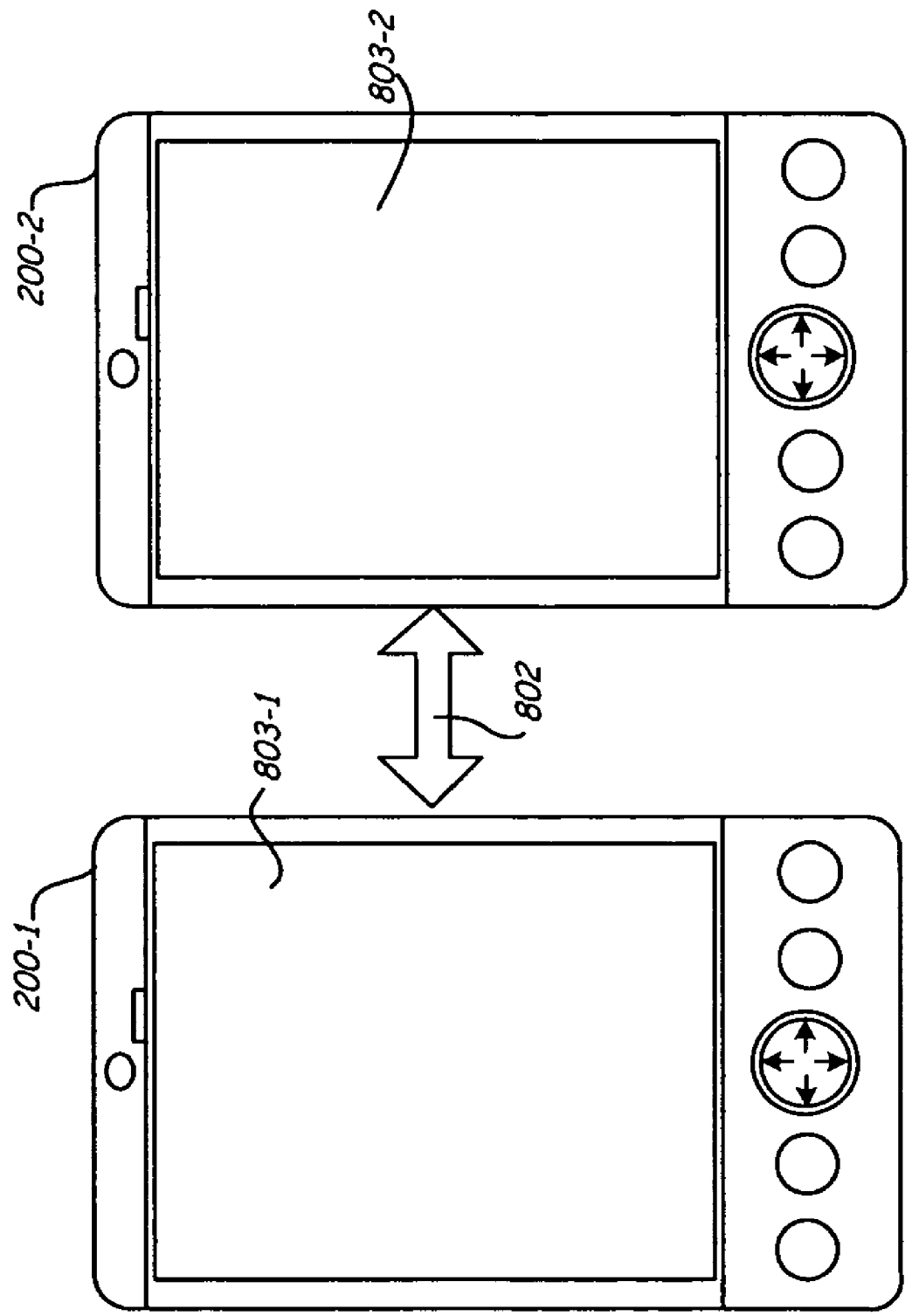
FIG. 9 is a diagrammatic illustration of the system shown in FIG. 8.

FIG. 9 illustrates a synchronous gesture connection 802 between mobile devices 200-1 and 200-2. In FIG. 9, displays 803-1 and 803-2 of the mobile devices are also shown. Frequently, the synchronous gesture connection will utilize the displays, either a mechanism for recognizing the synchronous gesture, or as a mechanism to implement the synchronous gesture (for example via the joint display of information, or via an illustration of the successful transfer of information). For simplicity, the network connection is not illustrated in FIG. 9.

Time Synchronization

In the implementation of synchronous gesture recognition in accordance with various embodiments, it must be determined which samples from a local device (for example mobile device 200-1) and remote device (for example mobile device 200-2) are truly "synchronous" in the presence of network delays. Network protocols such as SNTP (Simple Networking Time Protocol) can synchronize the clocks of a large number of widely distributed devices to within a small time delta. These protocols may cause the clock on a computer to jump forward or backward in the interest of synchronizing absolute time across multiple computers, making such protocols difficult to use for determining the relative time deltas between distributed sensor samples.

Synchronous gestures only require knowledge of these time deltas, so that local and remote sensor samples can be ordered in time to determine if two events occurred simultaneously (or nearly so). In one embodiment, the Synchronous Gestures implementing software used in the mobile devices 200-1 and 200-2 determines time synchronization as follows. When the two devices first communicate over network 801, the initiating device (for example 200-1) passes time T1, a millisecond timer since the machine was rebooted (for example using the GetTickCount Windows API call). The other device (for example 200-2) acknowledges this message and replies with its millisecond timer, T2. The first machine then notes T3, the time the acknowledgement was received. The networking delay, NetDelay, is then given by:

$$\text{NetDelay} = (T3-T1)/2$$

In one embodiment, the software recalculates the networking delay if the result is too large (e.g. due to a momentary dropout). More rounds of communication can also be added to arrive at a more exact average networking delay, but since the synchronization demands of the techniques of the various embodiments are modest (on the order of 50 ms) further precision may not be necessary. Other methods of calculating the network delay can also be employed.

Once the networking delay is known, the offset, ClockOffset, between the two millisecond timers is given by:

$$\text{ClockOffset} = T2-T1-\text{NetDelay}$$

This ClockOffset is all that is necessary to calculate if two events (time stamped with the local processor's millisecond timer) occurred at the same time. Note that once this ClockOffset is reliably determined, it does not matter if the networking delay changes in the future. The only reason to recalculate the ClockOffset would be to correct for possible long-term drift in the clock rates.

Other time synchronization algorithms can alternatively be used. The Reference Broadcast Synchronization (RBS) algorithm enables synchronization to within less than a millisecond. The RBS algorithm is described, for example, in the paper: Elson, J., Girod, L., Estrin, D., *Fine-Grained Network Time Synchronization using Reference Broadcasts*, Proc. Fifth Symposium on Operating Systems Design and Implementation (OSDI 2002), Boston, Mass. Implementing RBS potentially allows systems of the various embodiments to more easily reject undesired accelerometer signals that might randomly arrive from separate machines close together in time, but which do not actually occur at the same instant, as with intentional bumping.

Alignment of Time Frames During Gesture Recognition

In exemplary embodiments, the remote device or tablet 200-2 buffers its own sensor samples and, every 100 ms, sends whatever new samples have accumulated to a "server" device 200-1, which performs synchronous gesture recognition. The server buffers several seconds worth of time stamped accelerometer data from remote device(s) and compares it to its own time stamped sensor data (if any). Since reception of remote data may be subject to random network delays and momentary drop-outs in wireless connectivity, gesture recognition occurs by discrete event simulation rather than in real time in exemplary embodiments. From the user's perspective, however, unless there is an abnormally long network drop-out, recognition appears to occur in real time. The system will only miss a synchronous gesture if the drop-out lasts longer than the available buffer space to store local and remote samples.

If the server is hosted on a mobile device 200-1, the local samples from that device are not processed immediately. Instead, the server device waits until samples with the same time stamp (adjusted by the ClockOffset) arrive from remote device(s) 200-2. It then uses the time stamps to handle individual samples in order, until there are no more samples of the same age or older than the most recently received remote sample. Using this technique, it can properly measure simultaneity and measure time-outs between various events even though their arrival may be delayed and out of synchrony with the most recent locally obtained samples.

Also note that for recognizing a specific synchronous gesture, such as bumping two devices together, it is possible to recognize half of the gesture on each device independently. For example, each device could recognize when a single (local) spike on the accelerometer occurs. Then, rather than continuously sharing all sensor values, the devices can share and synchronize information only when one or more of the devices observes a spike. This would cut down on the amount of network traffic and reduce power consumption necessary to continuously transmit samples.

Scope of Synchronous Partners

With a large number of devices, looking for synchrony could overload limited wireless network or mobile device CPU resources, and also increase the possibility of false positive recognition of "synchrony" through pure chance. If a set of n devices attempts to synchronize with every other device, then there are $n^2$ one-way connections to consider. In practice, each pair of devices only needs to compute synchrony once, so $n(n-1)/2$ possible synchronies exist. Computing synchrony seems feasible for on the order of 10 devices, but may be computationally prohibitive or subject to increasing rates of false positive recognition if hundreds or thousands of devices must be considered.

Some way to restrict the scope of potential partners for synchrony would be useful for a large-scale implementation of synchronous gestures. Allowing users to explicitly select a set of connected devices to form a "synchronous gesture group" is one solution. Automatic techniques for restricting the scope of potential synchronies are also possible, and could be as simple as limiting communication to other mobile devices on the same subnet. For example, scope restriction techniques using the set of wireless devices visible to the wireless network access point with the highest signal strength could be employed. This could be further refined through location triangulation using signal strengths, thus limiting searches for synchronous gestures to other proximal devices. A possible difficulty comes from uncertainty in this data, e.g., two co-located devices might fail to search for synchrony due to error in location estimates.

Another strategy used in some embodiments utilizes the concept of a proximity server. In these embodiments, each wireless device registers its own signal strengths with a Proximity Server that is found via service discovery/service lookup. The proximity server can then reply by giving that device a list of machine names (or internet IP addresses) of all devices with similar signal strengths. In this way, a device can discover all nearby devices and communicate with them to establish synchrony.

A final strategy is to rely on peer-to-peer networking. Although current 802.11 cards have some difficulty working in peer-to-peer mode and infrastructure (access point communication) mode simultaneously, card designs which overcome this limitation are possible. Devices communicating in peer-to-peer mode using wireless technology can simply broadcast their synchrony data, and any device that is within range to receive that data can reply with its own local synchrony data. In this way, devices can establish synchronous gesture connections with any other devices within range of the local device's wireless transmitter. In some embodiments, the power of the transmission could be intentionally attenuated so that only nearby devices can receive the synchronization information.

Additional Synchronous Gestures

The embodiments described above implement synchronous gestures based on bumping objects together, with several interaction techniques based on variations of this gesture. A number of other possibilities for synchronous gestures exist. For example:

Synchronous Gestures Based on Human-Human Communication and Body Language.

In human-human interaction, there are many examples of familiar, naturally occurring synchronous or sequenced behaviors in body language and interpersonal communication. These naturally occurring gestures could be sensed and used as implicit contextual cues to augment human-human or human-computer interaction. Examples include shaking hands, two persons bowing to one another, people turning to face one another, and so on. Such interpersonal behaviors suggest points of departure for analogous but artificial synchronous gestures to facilitate human-computer interaction. Sensors which are designed to sense these kinds of cues can be employed to detect a synchronous gesture in other embodiments.

Synchronous Gestures from Commonly Available Devices.

Although the above-described embodiments primarily discuss synchrony between mobile devices augmented with sensors, synchronicity using ordinary input devices can also be exploited. For example, two users can press and release buttons at the same time to connect their devices, or mice from two different computers can be brought together until they collide, with the system software looking for simultaneous cessation of movement on both mice. Such actions might be useful to simulate synchronous bumping gesture on systems without any special sensors, or to support new techniques. Other synchronous gesture embodiments called stitching, which use pen input on mobile devices, are discussed below.

Synchronous gestures implemented in the current system include dynamic display tiling, sharing information by bumping together mutually held mobile devices, or pasting information from one mobile device to another by angling one mobile device down while making contact. Although described with reference to real-time recognition strategies, if sufficient memory exists to store all samples, synchrony can even be determined in the absence of constant wireless connectivity by detecting synchrony at a later time when both devices become connected to the network again. When bumping two mobile devices together to share information, for example, delayed recognition of synchrony might be useful to users who want to protect their privacy and explicitly give the OK to pass the information at a later time.

Bumping is also applicable to multiple PDA's, or cell phones, tablets, pagers, and other mobile devices. Furthermore, it is also possible to recognize bumping between dissimilar devices such as a tablet and a PDA. Also, the various embodiments are not limited to synchronous gestures between two devices. For example, three or more devices can be tiled together using synchronous gestures.

Stitching Synchronous Gestures: Pen Gestures that Span Multiple Displays

In yet other embodiments, unique synchronous gestures are established for pen-based tablet computers and/or handheld devices that can sense contact from a stylus. Those skilled in the art will recognize that a finger on a touch-screen display can also be used in this role as well as other approaches. With wireless networking, multiple mobile devices become a large input area that can track and coordinate the movement of a single pen or finger across the multiple mobile devices. This is referred to as stitching. For example, stitching allows a user to make a stroke with one pen (i.e., stylus 710 shown in FIG. 6) near the screen of a mobile device computer, across the screen bezel, and onto the screen of another mobile device. Such a gesture can be used to infer the spatial relationship between the two screens, and can be used as a gesture to connect the devices.

While several previous systems foster collaboration between ubiquitous devices, they may require special hardware such as overhead cameras or unique ID tags on each device, or they may require manual entry of network addresses and the geometry of displays. Stitching can be used as a new interaction metaphor that uses commonplace pen input capabilities to establish and manage serendipitous connections between pen-operated mobile devices. As described above, a stitching gesture consists of a continuous pen motion that starts on one mobile device, continues past the bezel of the screen, and ends on the screen of another device, as shown in FIG. 10-1 in which the path 852 of the pen motion is illustrated between devices 200-1 and 200-2. Such gestures serve as the basis for a flexible architecture that allows users to dynamically bind together mobile devices. Stitching can be implemented on a variety of pen-operated devices, does not conflict with existing uses for the pen, and provides a versatile framework that can accommodate future extensions.

From the user's perspective stitching seems like a single cognitive chunk, but the gesture actually specifies a number of properties of the connection:

It selects which devices participate in the connection.

One can phrase together selection of operands (e.g., a file to copy) and commands (how to combine the devices) with the stitching gesture itself.

By fitting a line to the pen coordinates as they leave one device and enter another, one can calculate the approximate spatial relationship between the two devices. This allows placement of graphics or providing feedback that appears to span the displays. See FIG. 10-1 for example. In some embodiments, the fit of the line to the pen coordinates can also be used as a criteria of whether or not to interpret the gesture as a stitching gesture.

One embodiment of stitching is a photo sharing application for the Tablet PC that supports operations such as copying images from one tablet to another that is nearby, establishing a persistent shared workspace for collaboration, expanding an image across multiple screens, or using one tablet to display a slideshow of images that a user selects from another tablet. Usability testing suggests that users readily grasp stitching, and find it compelling to have a straightforward means to perform cross-device operations. We also observed that sociological issues of co-located collaboration raise several design issues. We found it is important to support a range of device configurations, from intimate combinations of devices in direct contact with one another, to sharing information while maintaining social distance. The latter requires support of stitching between devices that are nearby one another, but not touching.

The Mechanics of Stitching

In portions of this application, the general concept of stitching is discussed in reference to a proof-of-concept photo sharing application called StitchMaster, which represents an example embodiment of the various embodiments. With digital photography becoming widespread, sharing photos with others is a task of interest to many persons. Also, many of the semantics that we wanted to explore with stitching, such as expanding an image across multiple screens or copying objects from one screen to another, represent useful and compelling operations for digital photographs. To begin, each user launches StitchMaster on his own tablet, which displays that user's photo collection as a set of thumbnail images. However, other applications and data types may be shared via stitching gestures.

1. Establishing a Connection

In one embodiment, stitching takes place between devices that can sense the same pen; the user names the devices to connect by moving the pen across them. Since there is a natural order implied by the gesture, stitching also establishes which machine is the sender of information, and which machine is the receiver. Some connection techniques are inherently bidirectional and do not naturally provide this information. In other embodiments, stitching between devices with dissimilar pen or touch-screen technologies can be achieved by having one user draw each half of the stitching gesture with a pen, finger, or other pointing device sensed by the corresponding machine, or by having one user perform the first half of the gesture on a first device and a second user complete the gesture on a second machine.

Each participating device sends its pen events to a stitching server, which may be hosted on a machine in the environment to offload computation from the mobile devices. The stitching server synchronizes time between the devices and looks for matching pen traces; when a match is found, in one embodiment the server sends a stitching event that informs the devices of the other devices' network address. In other embodiments, the devices can communicate anonymously via the server without exchanging their actual network addresses. Each participating device must know the network address of the server, but this is the only address needed to bootstrap the system. This address may instead be found via service lookup mechanisms, by using wireless signal strengths to locate a nearby server, or by using multicasting to query for available servers. In some embodiments the server is hosted on one or more of the participating mobile devices. The server may migrate, or partition the hosted devices, between multiple mobile and fixed computers that can individually or collectively act as "the server".

Stitching Recognition

The stitching server recognizes a stitch by looking at the patterns of pen activity from each pair of participating devices. We define an envelope as the time interval during which the pen is in range of the screen and is moving at a speed above a predetermined threshold. In one embodiment, the stitching server then looks for two consecutive envelopes from a pair of devices that match a specific pattern:

The first envelope must end near the first screen's border and last longer than dTmin1 (250 milliseconds).

The second envelope must start near the second screen's border, and last longer than dTmin2 (=100 ms).

The second envelope must start after the first envelope, but it may occur no longer than dTmax (=3.0 s) after the first envelope. This time interval is sufficiently long to support stitching between tablets that are within arm's reach (a maximum of about 75 cm).

Those skilled in the art will recognize that alternative recognition criteria for the envelopes are possible within the scope of the present invention, including shorter or longer envelopes, or envelopes with different threshold speeds, or even just a tap on each screen. Such alternative envelope designs may form a preferred embodiment in some situations, such as cases where the user explicitly issues a command to connect to another device, and then points to additional device(s) to connect to, rather than having stitching being sensed as an implicit gesture.

It has been found that these criteria suffice to recognize intentionally executed stitching gestures, but just as importantly, false positives were not a problem: incidental pen motions from two users concurrently using pens on their mobile devices rarely satisfy these criteria. In some embodiments, additional dialogs or confirmation gestures can be performed by the user to verify that an intended connection was formed correctly, or alternatively to sever an unintended connection before the actual content of any files or data structures are transmitted to the other device(s). Such confirmation gestures can include entry of a password, biometric identity confirmation, or other security features.

User Feedback for Stitching-

In one embodiment a stitch is recognized as soon as the first 100 milliseconds of the second envelope have been observed by the stitching server; it does not wait for the user to finish the motion. Performing this eager recognition allows the system to provide users with feedback of the stitching gesture as soon as possible after the user has entered the second screen.

In one embodiment, feedback for a successful stitch consists of a short chirp sound as soon as eager recognition takes place. If the stitching gesture includes any operands, then the system shows a semi-transparent blue shadow on the screen in the shape of the selected photos (FIG. 10-2(*a*)). In other embodiments, tentative feedback for other object and file types can be provided instead. Upon completion of the stitching gesture, the system provides additional feedback in some embodiments. For example, for a copy or move operation, StitchMaster shows an animated semitransparent cone that appears to whisk files from one machine to the other (FIG. 10-1). This provides clear feedback of where the files came from, and where they were copied to (FIG. 10-2(*b*)). Note that such feedback may be independent of when the actual file transfer occurs in some embodiments.

2. Specifying Connection Type: Multi-Device Commands

Multi-device commands supported by StitchMaster include copying or moving photographs, establishing a persistent shared work space, expanding an image across multiple displays, or entering a presentation mode known as the gallery (described below). StitchMaster presents these options in a pie menu. In other embodiments, additional commands and options for how to link devices can be presented in the pie menu or other selection dialogs.

There are two basic design choices for where the command selection can occur:

Local menus: Users choose the command (e.g. Copy) on their local screen, and then stitch to indicate the remote device that is involved.

Remote menus: Users stitch to another device, and then a menu appears on the remote device providing options for how to combine the devices.

StitchMaster implements remote menus, which allows the visibility of multi-device operations to be limited to situations where they are known to be applicable; thus the single-device user experience is not complicated with options for multi-device operations. Remote menus appear at the end of a stitching gesture when the user holds the pen still for 0.5 seconds. To provide feedback that a menu is a remote menu, StitchMaster shows a transparent blue cone that connects the remote menu back to the display where the stitching gesture originated (FIG. 10-3). However, in some embodiments local menus are preferred, particularly if the other display(s) are beyond arm's length, and the stitch must be completed by the other user(s).

For some stitching gestures, StitchMaster assigns a default operation, eliminating the need to use the menus. For example, when stitching with a selected photo (that is, stitching using an operand as described in the next section), by default the selected photograph is moved to the other screen. Other embodiments can have different default commands, depending on the devices, applications, and/or data types that are involved in the stitching operation.

Example Multi-Device Command: The Gallery

The Gallery (FIG. 10-4) allows one user to give a presentation of selected photos to another user. To start the Gallery, the presenter selects an image to start with, stitches to the other screen, and chooses Gallery from the remote menu. The other tablet then displays a full-screen view of the selected image, while the presenter's tablet displays thumbnails of all of his photos. The presenter can click on any thumbnail to change the image that is displayed on the other tablet.

The Gallery changes the roles of the devices. Instead of two identical devices, we now have one tablet for interaction, while the other primarily serves as a display. If users separate the devices, but keep the Gallery running, the presenter's tablet becomes a private view, while the other tablet represents a public view of selected information. In some embodiments, the Gallery links the interaction device to multiple displays.

3. Specifying What to Share: Stitching with Operands

StitchMaster supports tapping on a single photo to select it, or drawing a lasso to select multiple photos. StitchMaster outlines the selected photos in orange and scales them to be slightly larger than the others (FIG. 10-5). Users can select a photo and then perform a stitching gesture to another device all in one gestural phrase. The user makes a selection, and then lifts the pen slightly so that the pen is no longer in contact with the screen, but is still within tracking range of the Tablet PC screen. The user then stitches to the other display, and the selection is treated as the operand of the stitching gesture. In some embodiments, the user can also just drag the object to the edge of the screen to achieve the same effect.

Phrasing works well, but we observed that users sometimes become focused on the selection step, and momentarily forget about stitching. Therefore, we do not require that stitching follow selection in a single uninterrupted gestural phrase. A stitching gesture that starts over a selection also includes that object as an operand, but after 3 seconds, the selection cools and will no longer be treated as the operand for a stitching gesture. The highlights around selected photos turn blue once the selection has cooled. This approach prevents old, stale selections from mistakenly being interpreted as the operand to a stitching gesture.

4. Sharing Physical Space

With varying social and cultural conventions, individual preferences, and changing needs depending on the task, users need flexible ways to share physical space when combining devices. Hall distinguishes two distances within arm's reach, intimate and personal, with social and public distances beyond that. StitchMaster includes support for intimate, personal, and social distances. Some embodiments also include features for 'public' distances, such as notifying the user when a device that they have previously connected to is detected within wireless communication range.

Intimate spaces support tight collaboration between friends or colleagues who may need to work together on a large document. For example, StitchMaster supports placing two tablets together and then expanding an image to fill both screens. The displays act as tiles of the same virtual space. This style is also well suited for a single user wishing to extend his workspace with additional devices.

Personal spaces. Users can stitch together tablets that are separated by up to about 75 cm. This allows a space created by stitching to act as a whole, yet each user maintains his or her own personal space. For example, StitchMaster allows users to create a persistent shared workspace by making a "simple stitch" from one screen to another without any operands. A vignette that appears to surround the two screens turns red to give users ongoing feedback that the two machines are connected. Either user has veto power over the connection and can close the workspace by choosing Disconnect from a menu.

Social spaces. Once users join a shared workspace, they can further separate their devices, yet still work together. For example, a user can employ the transporter to give photos to the other user, even if that user is no longer within arm's reach. The user drags a photo to the edge of the screen, and dwells with the pen. After a brief pause, during which an animation of a collapsing blue square is displayed, the photo is transported to the other device. This pause is necessary to separate transporting a photo from normal drag operations; the collapsing blue square gives the user feedback that the picture is about be transported. In some embodiments, no pause is necessary, particularly if the underlying application does not need distinguish transportation from other drag operations.

Orientation of spaces. In an example embodiment, StitchMaster only supports stitching between tablets that are at the same physical orientation, so users must sit shoulder-to-shoulder. However, research suggests that communication patterns change when persons sit face-to-face, shoulder-to-shoulder, or at 90 degree angles to one another. In other embodiments, Stitching can be extended to support pen gestures that span tablets in any of these orientations, as well as other orientations, such as devices that are side-to-side but facing opposite users.

5. Calculating the Spatial Relationship between Devices

To infer the spatial relationship between devices, stitching fits a line equation to the coordinates traversed by the pen on each screen. Of course, users do not move the pen in perfectly straight lines, but users do tend to move in arcs that can be locally approximated by a straight line.

When the stitching server detects a stitch from Device1 to Device2 (i.e., devices 200-1 to 200-2), it records a small window of samples as the pen leaves one screen and enters another, yielding p0 (the exit point of the first pen trace), p10 (the entry point for the second pen trace), p11 (the point at which the stitch was recognized), and $\alpha 0$ (the angle of motion at p0); see FIG. 10-6.

Due to the sampling rate of the pen, the first and last pen locations reported by the tablet may fall up to 3-4 cm from the edge of the screen. It was found that calculating the width of the screen bezel or the extent of any empty space between the devices by using the time interval between the last and first observed samples may lead to inaccurate distance estimates. For this reason, in one embodiment, the device's bezel thickness is initialized as a fixed constant, and then any empty space that may be present between the devices is ignored. In other embodiments, particularly where the pen can be sensed with sufficient fidelity as it is exiting the screen, the approximate distance between devices can be calculated via distance=velocity*time.

The intersection of the stitching gesture is estimated with the edge of each screen, yielding the points PA and p1. PA is the intersection of the screen edge of Device1 with the line that passes through p0 at an angle α0; p1 is the intersection of the second screen edge with line that passes through p10 and p11 at angle α1. If the line between PA and p1 has angle α, the offset between the two screens is then tan(α) times the bezel width. We estimate α as the average of α0 and α1, which seems to work well, even if the user follows an arcing path while stitching. We then calculate PB as the displacement of p1 along the edge of Device2's screen by offset pixels.

Using this approach, exemplary embodiments of the systems of the various embodiments can transform points from one device's coordinate system to the other, thus allowing the presentation of graphics that appear to span the devices. In some embodiments, the pen coordinates can also be used to calculate rotation and scaling parameters so that devices with dissimilar orientations or pixel aspect ratios can still present graphics relative to the coordinate system of the other devices'screens.

6. Coexistence of Stitching with Traditional Interactions

Stitching should allow users to establish connections between devices without interfering with existing uses for the pen. Input states supported by pens include tracking (moving the pen in close proximity to the screen, causing the tracking symbol to move), dragging (moving the pen in contact with the screen, causing an action such as dragging an object or leaving an ink trail), and out-of-range (the pen is not in the physical tracking range of the screen).

Stitching can be implemented using the dragging state, or using the tracking state. StitchMaster implements options to use either style of stitching, or both can be supported simultaneously (this is the default).

Stitching in the Dragging State

Since traditional graphical user interface (GUI) interactions occur in the dragging state, performing stitching by dragging could conflict with them. For example, when stitching via dragging, the first device cannot be sure whether to interpret a pen stroke as a drag until the second device recognizes the completion of the stitching gesture. To circumvent this problem and allow stitching via dragging to coexist with other dragging operations, in one embodiment speculative execution is used: StitchMaster initially assumes all pen strokes are intended as drags. If the stitching server then reports a stitch, StitchMaster undoes the drag and instead treats the gesture as part of a stitch.

During preliminary user testing, it was found that users can easily make a stroke while keeping the pen in contact with the screen, but when stitching to another display, the screen bezel gets in the way. This makes it hard for users to make a quick, fluid pen motion across the bezel while bearing down on the pen. Instead, users must drag the pen to the edge of the first screen, lift the pen to jump the screen bezel, and then complete the stitching gesture by pushing the pen back into contact with the second device's screen.

Stitching in the Tracking State

Stitching from the pen's Tracking state represents a more advanced skill than dragging, as it requires moving the pen while keeping the tip within approximately 2 cm of the screen surface to prevent it from entering the out-of-range state. However, stitching by moving the pen just above the surface of the screen (with the base of the hand resting on the screen) allows'the user to make a continuous, quick, and fluid movement that is not interrupted by the physical "speed bump" of the screen bezel. Another advantage of stitching in the tracking state is that it avoids the need for a speculative execution scheme: stitching gestures occupy a separate layer that rests on top of GUI interactions.

The main drawback of implementing stitching in the tracking state is that currently available personal digital assistants (PDA's) do not support tracking, so implementation of the embodiments of stitching discussed herein on PDA's such as the Microsoft Pocket PC can only support stitching in the dragging state. However, future implementation should correct this. Another potential problem is that users may use the pen to gesture while talking about the contents of the screen with a colleague, potentially resulting in a false-positive recognition of a stitching gesture. The stitching recognition techniques of the various embodiments are designed with this issue in mind, so false positives are rare, but no recognition scheme is foolproof.

Multi-Device Stitching

In one embodiment, the stitching system architecture has been extended to support formation of sets of up to 16 devices. However, even more devices can be stitched together. The only limitation to the number of devices that can be stitched together is the management of the corrections of each device. The stitching server adds a device to a connected set if the user stitches between a connected device and a new, disconnected device. Extension to even more devices can be achieved. In some embodiments, users of devices already connected together can vote or have individual veto power over a new device joining a connected subset of devices. Users also have the option to disconnect when a new device joins a connected subset.

Stitching with Other Types of Devices

PDA's. Currently available PDA's cannot sense the tracking state. Since stitching can use the dragging state, it is possible to support stitching on PDA's. Including PDA's in the system of the various embodiments allows interesting new applications. For example, two designs are considered that use PDA's to alter the proxemics of stitching (FIG. 10-7). Porches 1000 use PDA's 1010 or other mobile devices as public areas for receiving visitors; each tablet 200-1, 200-2 has its own porch. To give a file to someone else, a user moves it onto the other user's "porch" via stitching, or to offer a file for taking the user leaves it on his own porch. The other user can then take the file from a public porch into the more closely held main screen area. This reduces the need for each user to violate the personal space of the other user. In some embodiments, the porch may be part of the main screen of the tablet, rather than a physically separate device. The candy dish 1050 places a single PDA 1010 or one or more other mobile devices in the no-man's-land between two other devices 200-1 and 200-2. Each user may then place files into the PDA via stitching, or take files that have been left there by the other user. Again, the users would not have to reach into each other's personal space to share files.

Large Displays. It is possible to support stitching from small devices onto a large-format pen-operated display. Because of the size disparity, the small device may occlude part of the large display, and stitching gestures may leave the edge of a small device but enter the large display almost anywhere. Since some current recognition algorithms look for stitches that cross the edges of the screens, recognition policies have to be adapted. To avoid false-positives, some embodiments may preferentially use a pen with a unique ID capability or to consider further features of the pen or finger motion, including:

The direction of travel or the curvature of the arc that the pen makes as it exits one screen and enters another.

The velocity of the pen.

The pen tilt angles (azimuth and elevation).

Some embodiments avoid these issues by still restricting stitching to the screen edges, even when stitching to a physically large display surface.

Alternatively, one could avoid recognition by requiring the user to explicitly signal stitching gestures. For example, the user could select a menu command such as Stitch to Another Device . . . before starting a stitch, or the user could hold down the barrel button on the pen, or another button or control proximate to the mobile device, while stitching.

Similarly, the receiving device can have menu options, buttons, or other controls to explicitly signal a command such as Accept Stitch from Another Device.

Edges in Large Displays

The requirement that a stitch must start/end on a device edge applies well to devices that are bound by one's arms reach. However, large displays or whiteboards edges may not be as easily accessed as in smaller devices such as PDAs and TabletPCs. An alternative to use the physical edges of a large screen is to define an area of it that will serve as the place where other devices can be stitched. There are both advantages and disadvantages of having this area fixed on a particular region of the screen. Having a fixed area (both in size and location) is advantageous since there is a well established region that users can use and can always point at. However, one can imagine cases when that area is not reachable because the user walked away from it.

There are a number of ways in which this "stitch area" can be defined. For example one can use the physical edges of the connecting device as a "french-curve" to trace two edges on the inside, and then on the outside of the mobile device. This not only allows defining a stitching area, but also serves as an initial synchronous gesture to connect the devices.

Further Stitching Discussion

It is also possible to look for specific patterns of simultaneous pen activity from separate users on separate mobile device screens. For example, two users on opposite sides of a room can engage in simultaneous scribbling by making sweeping circular motions with their pens at the same time. This can "drill through" to the other user, bringing up a shared workspace.

One particular challenge with this class of interaction techniques is to differentiate these intentional gestures from incidental patterns of activity that might result from user's pointing at each other's mobile devices, or performing simultaneous but independent pen movements. Systems in some embodiments of the various embodiments use the dynamics of the pen gesture (that is, properties calculated from individual time-stamped pen coordinate data, including but not limited to pen velocity, curvature, direction of travel, and limited time-outs between exiting one screen and entering another nearby screen). In some embodiments it is also required that the pen traverse particular regions of the screen, e.g. the outermost 20% of the screen, both when exiting one mobile device and when entering another. In this way only continuous gestures intended to perform "stitching" will be recognized as such, but incidental pointing movements that may occur incident to verbal discussion will not have unintended consequences.

Stitching involves continuous movement of the stylus or pen 710 from the display screen 803-1 of one mobile device 200-1, across the screen bezel 850-1, and onto the screen 803-2 of another mobile device 200-2 as shown in FIG. 11-1. In FIG. 11-1, this movement is represented by line segment 852. In FIG. 11-2, this movement is represented by line segments 854.

Note that although the mobile devices are shown as touching in this figure, it is not necessary that they be in actual physical contact. Supporting stitching between mobile devices that are not physically touching is very important for social reasons. In many cultures, unwelcome touching immediately raises feelings of apprehension, mistrust, withdrawal, or other negative consequences. This applies to one's own body as well as to totems—personal objects or possessions that act as a proxy for one's self. Hence being forced to place one's mobile device right next to another user's device, and leave it in contact, may not be acceptable in some cultures, between some users, or in some situations.

In one embodiment the mobile devices may be separated anywhere from 0.0 to 1.0 or more meters and still respond to stitching gestures. The user also may configure this parameter to change the distance that is allowed. This distance also may vary by direction; for example, users seated next to one another will desire greater separation, but users seated face-to-face across a table have the physical barrier of the table between them, and may be more willing to put the tops of their mobile devices in close proximity. The distance may also be configured based on the cultural norm for the user. For example, Latin American users may tend to use closer social distances. Note that in some embodiments the system does not measure distance, but only approximates it using a time-out. For example, a time out of a few seconds allows the user to move the pen to any other screen within arm's reach.

Finally, in other embodiments it is possible that the displays physically overlap or occlude one another, such as when a small display is used on a large pen-sensitive wall display or pen-sensitive tabletop display. In this case, the user may stitch from the small display to the large display (or vice versa) without having to be "next to it"; the user can instead be completely or partially "on top of it".

The simple linear segment stylus movement 852 illustrated in FIG. 11-1 is quick and easy to perform. The more complex form of stitching represented by line segments 854 in FIG. 11-2, and other complex forms of stitching, can be used to imply different semantics (commands) for connecting devices.

The software looks for the resulting pattern by time-synchronizing samples from each mobile device. Stitching takes advantage of proximity tracking, which is the ability of mobile devices to track the position of the pen when it is merely proximal to (not touching) the screen, as shown in the three-state model of FIG. 11-3. All Tablet PC's support proximity tracking (but note that current PDA devices do not). Stitching operates in the proximity tracking state, whereas inking, gesturing, or pen interaction with traditional GUI widgets occurs in the dragging state. The main reason it is proposed that stitching be implemented in the proximity tracking state, as opposed to the dragging state, is to avoid user confusion with or accidental activation of traditional GUI widgets, inking, or gesture input.

However, in some embodiments, the system does allow stitching while in the dragging state, or in a combination of the dragging state and the proximity tracking state. For example, the user may hover above a tablet PC, and then bring the pen into contact with the screen and continue dragging on a Pocket PC (which cannot sense proximity tracking). This enables stitching between dissimilar devices. In some embodiments, users may choose an option that allows them to perform stitching in the proximity state, in the dragging state, or in either state (including combinations of the two).

While stitching is quick and simple to do, it provides quite a bit of information:

It selects which devices participate in the connection.

It specifies the spatial relationship between the devices. Is the connecting device left, right, above, or below?

It specifies a direction to the connection. The gesture starts on one screen and ends on the other, so it naturally indicates a hierarchy or direction of flow for information.

It provides enough information to determine the alignment between the screens. Are the screens exactly aligned? Is there a translational offset? Perhaps some rotation if the bezels are not snugly placed together? Knowledge of this alignment can be used to accurately place graphics that span the screens, or the offset might intentionally become part of the manipulation vocabulary (i.e. forming a large shared screen vs. forming a split-screen when the tablets are offset from one another). Note that the alignment can be calculated using the geometry of the pen gesture itself. In some embodiments, the system can also calculate the distance between the screens by using the pen velocity and the measured time-out between the pen exiting one screen, and entering another nearby screen. In other embodiments, the dimension of the screen bezel is read from the system registry, and any additional space between the screens is treated as if it were not there.

Stitching with Marking, Glyphs, or Suggestions

To extend the sets of actions that stitching can support, it is valuable to integrate a selection mechanism such as marking. There are several possibilities:

Marking: Integrate marking or another menuing mechanism with stitching. This can be achieved by making the stitch in the proximity tracking state, then dwelling (hovering) with the pen. The user can also complete the mark without hovering as shown in FIG. 12-1. The marking menu appears after a time-out. This has the nice property that the user can stitch and mark in the hover state as a single flowing gesture (stylus movements represented by stitch line segment 852 and mark line segment 858) if they are already familiar with the menu. This places the command portion at the end. In other embodiments, the command portion can be placed first as shown in FIG. 12-2 which includes the selecting stylus action (for example circling, etc) represented at 860 followed by the stitch line segment 852.

Glyphs & Gestures: Distinguish multiple types of stitching actions by turning the stitch into a more complex gesture or a movement that includes glyphs. FIG. 10-2 shows one example, and FIGS. 13-1 and 13-2 show others. FIG. 14-1 shows yet another which is used in one embodiment to implement the "Copy" task. A glyph can appear at both ends of the stitch (see FIG. 13-1), just at the beginning (see FIG. 14-1), or just at the end. These and other examples of glyphs and different stitching gestures are used to distinguish multiple types of stitching operations (e.g. tile displays, establish shared whiteboard, instant messaging, etc.).

Suggestions: The user makes a stitching gesture, and then several alternative suggestions of what the stitch means are displayed. The user picks one to complete the action.

Eraser Stitching: Users can also make the stitch gesture with the eraser end of the pen. This can be defined to a different meaning. It could also be used to explicitly "erase" a connection if desired. However, an action on a single screen, such as erasing the icon that represents the connection to the other tablet, would often work just as well and would typically be easier to do.

Stitching with Operands

It is possible to stitch together displays with an operand, such as a selected file that is to be copied from one mobile device to the other. This allows the implementation of "Pick and Drop" without a unique ID feature on the pen. An example of a conventional "Pick and Drop" implementation is described in the article: Rekimoto, J., *Pick-and-Drop: A Direct Manipulation Technique for Multiple Computer Environments*, Proc. ACM UIST'97 Symp. on User Interface Software & Technology, 1997, 31-39. Selection could simply fall back on traditional selection mechanism, but there is a problem. If a stitch uses the currently selected object as an operand, then any time the user happens to leave an object selected, it will not be possible to do a simple stitch without an operand. One solution is to implement a short time-out after the selection; if the stitch does not occur shortly after the selection, then it is not treated as an operand.

Another solution is to integrate object selection tightly with the stitching gesture itself. For example, selection can be a loop gesture or glyph while proximity tracking that surrounds the object being copied. This is then followed by a simple linear stitch gesture to the other display. This is illustrated in FIG. 14-1. Alternatively, the gesture can start by pressing the pen to the screen to create a selection rectangle, or to draw a lasso around objects to select as shown in FIG. 14-2, then lifting the pen and making a linear stitch in proximity onto the other display. Finally, crossing over an object with a stitch is another option. This option could result in increased errors when stitching occurs in the tracking state.

Using a drag rectangle or lasso gesture allows selection of multiple objects. For example, a complex path circling (and thereby selecting for copying) multiple objects prior to the stitch movement to the other screen is shown in FIG. 15. The result would be the copying of these objects from device 200-1 to device 200-2.

Cooperative-Stitiching

As discussed above a user can create a transient or permanent connection between two devices by doing a gesture that spans multiple devices. However, there are cases when the "stitch"/connection gesture need not to be performed by one person only. These examples include where the devices are co-located but not within arms length of the user that proposes the connection. Where devices are within arms reach, but having a person invading another's personal space may be not acceptable (because of privacy, or personal issues), or where one may want to establish a one-to-many connection, without having to perform N pairwise connections in order to do so. Further, there are scenarios where many-to-one connections may make sense, e.g., when someone collects exams from a group. However, this case is different in nature from the previous ones and at first sight involves issues of synchronization between multiple senders.

In one embodiment, it is assumed that the devices will not always be in contact, and therefore precise calibration between the devices screens will not be always possible, if desirable at all.

Design Space

Synchronous gestures such as stitching are "sequential", i.e. each half of the gesture occur one after the other, but with cooperative stitching however, there is also the option of a parallel way of doing it.

Figure 16:
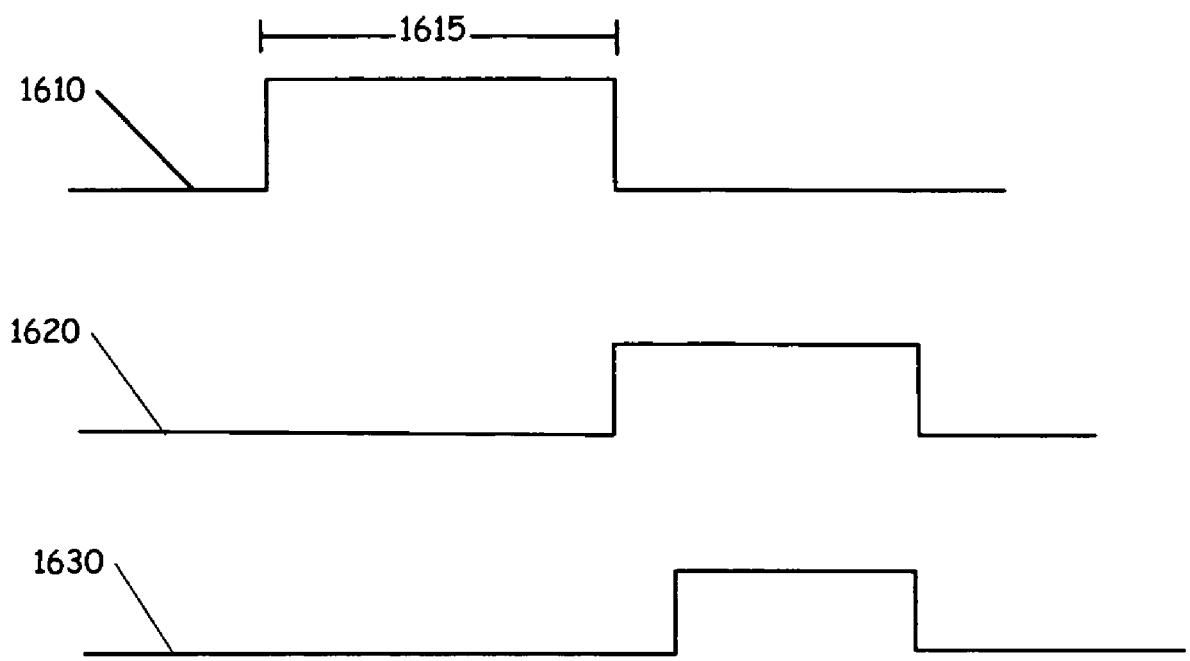
FIG. 16 is a time illustration of sequential stiching.
Figure 17:
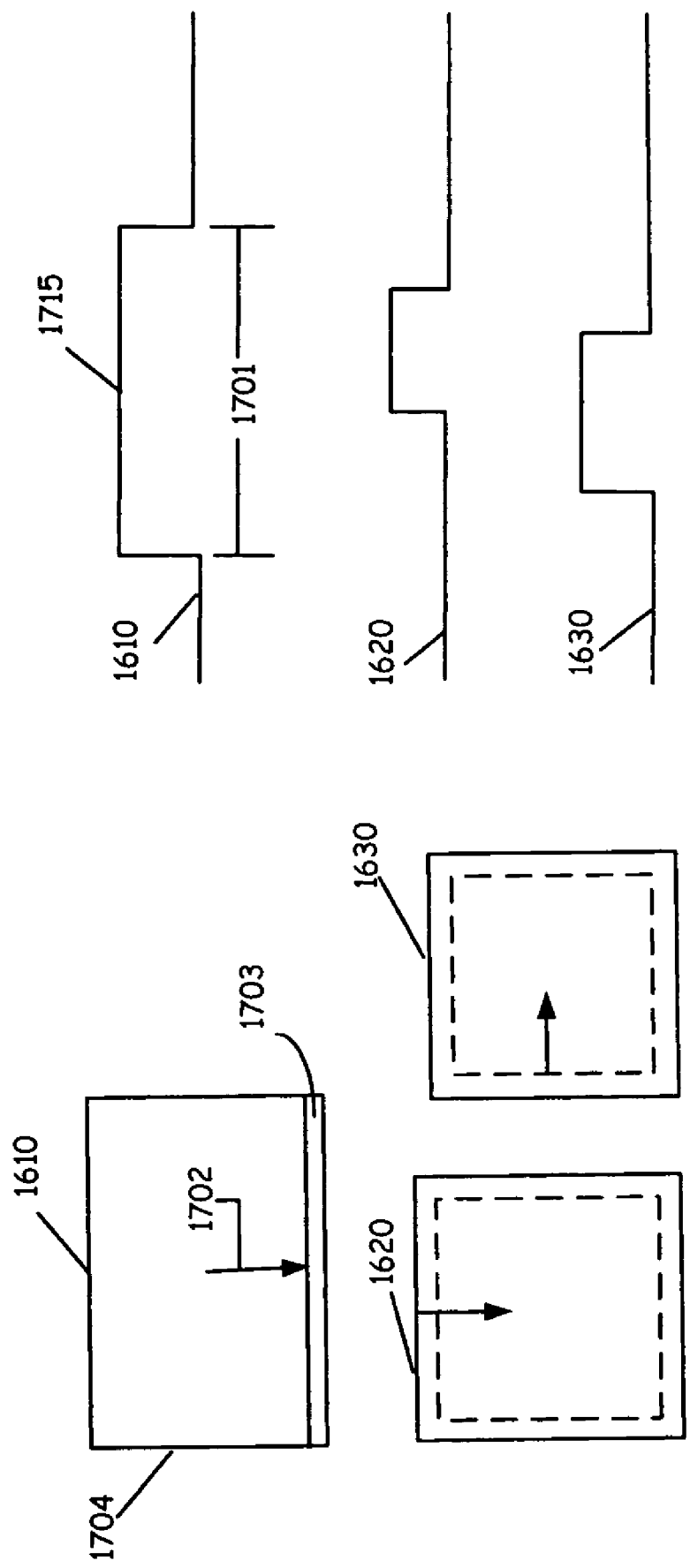
FIG. 17 is a time illustration and a diagrammatic illustration of the devices during a sequential stitching process.

FIG. 16 illustrates the sequential stitching of the second half or halves of a connection gesture which occurs right after the first half. This modality provides unambiguous semantics about which device proposes the connection (device 1610) and which devices are joining (devices 1620 and 1630), i.e., device 1610 comes before devices 1620 and 1630. It is not necessary to know how similar the second half needs to be in terms of duration, both in a starting point in time and duration. In other words, the second part of the stitching does not need to be exactly equal to the first half either in time or starting point.

It can be said that this connection mode resembles direct manipulation, or token-giving patterns of human activity. One cannot grab something that is not being offered. This provides an example of about how this interaction works in a real world scenario.

The person on device 1610 who is initiating the connection will do their "half-stitch" illustrated at 1715, and will maintain the invitation "open" as illustrated by 1701 for as long as they hold the stylus 1702 on the border 1703 of the screen 1701. Any devices 1620 and 1630 that wish to participate on the connection may join only during this window of opportunity.

The above exemplary embodiment assumes that the device that allows the hold was a button, or works as the dragging state of the stylus. It is also assumed that it is easy to hold the position, such as when a bezel in the tablet PC or pocket PCs is present. In embodiments without such a bezel, the software may increase the range of motion of the stylus that is allowed while holding the stitch. Furthermore, some embodiments do not require a user to hold the stitch open at all, but rather use an automatically held time window.

When using the stitch with hold approach graphical feedback is provided that can assist in the successful establishing of connections. If device 1620 initiates the stitch, and 1620 and 1630 are potential parties interested in participating in the connection, then FIG. 18 illustrates an example of what each party could see according to one embodiment.

Figure 18:
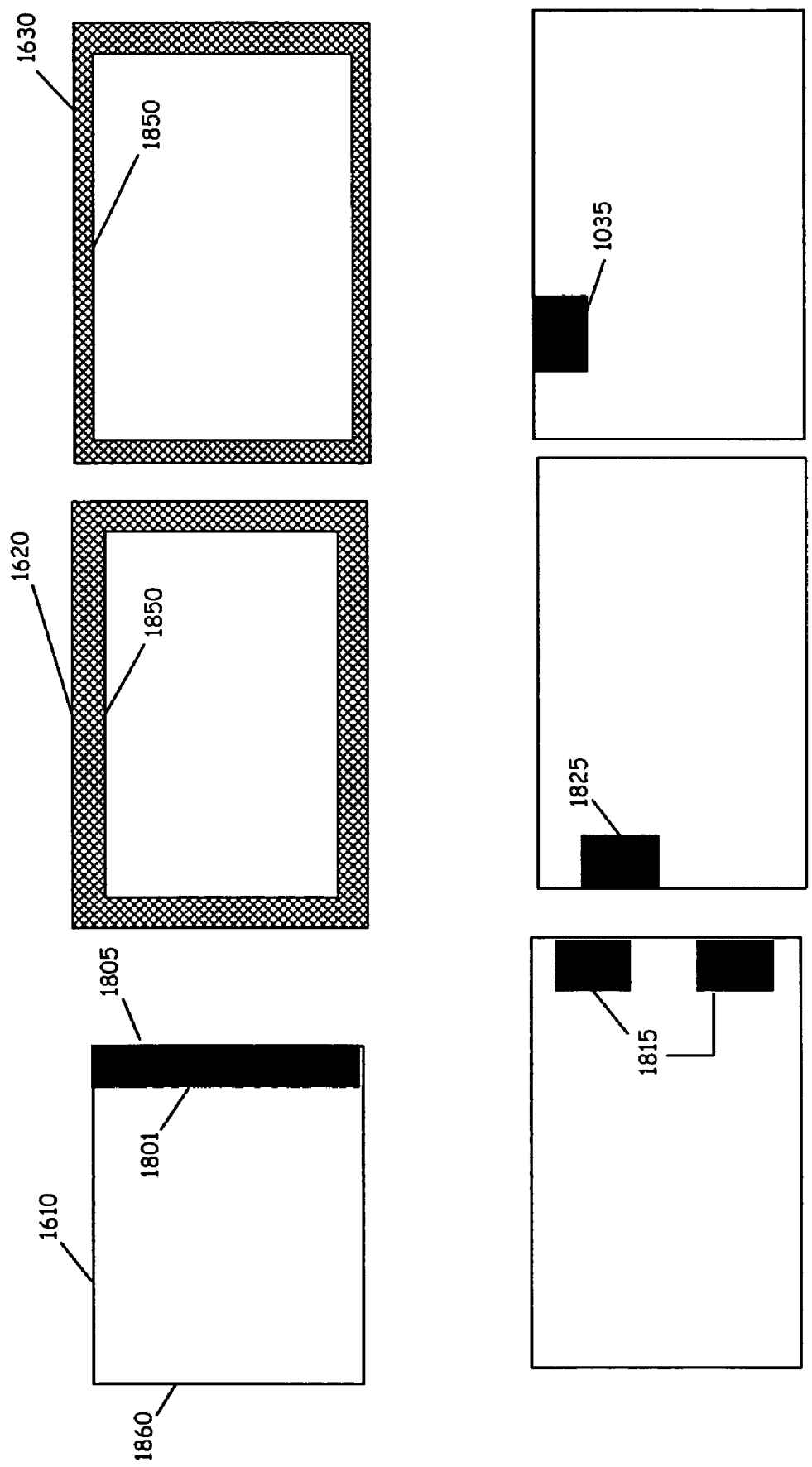
FIG. 18 is a diagrammatic illustration of displays during the stitching process

In FIG. 18 the operator of device 1610 holds the style or other pointing devices over a portion of the Screen 860. At this point an area 1805 around the pointing device 1801 becomes highlighted. On the other device 1620 and 1630 are ghost border 1850 can appear on the device 1620 and 1630.

The user of each device 1620 and 1630 accepts, in one embodiment, the connection by touching in a portion of the ghost image 1850 with a pointing device and dragging the image. Once the connection is made an indication such as tabs 1815, 1825, and 1835 are displayed. In this embodiment the initiating device 1610 has two tabs 1815 that illustrate those devices that have accepted the connection. Tabs 1825 and 1835 illustrate that a connection has been made. However, the above figures and description just outline one example of how the connection is formed, and other methods of indicating and confirming a connection can be used.

Privacy and Authorization

The privacy of an offered connection may be a concern to users. Users want to be sure that the information they are sending to other device(s) is delivered to only those device(s) and that other devices are not intercepting messages. At the same time users don't want to be flooded by unsolicited connections that may be requested in a collocated environment. Steps needed for security and privacy generate a tension with simple, quick, and fluid connection techniques. Adding complicated security or failsafe protocols can severely hinder the fluidity of the connection process, yet may be desired by users in some embodiments to ensure secure transfer of information.

In one embodiment users are given a veto power over the connections that occur in the collocated setting. In one embodiment a sender is made aware of who is connecting with them and can select who should or should not be allowed in the connection. In another embodiment a receiver is made aware of who is receiving and what information is received, and lets them accept or reject the incoming connection. The above controls provide a good compromise in that as long as users feel aware and in control, they will accept the level of privacy/security that the interaction has to offer. Yet users still have the option to take extra steps to cancel or disallow connections and/or data transfers to other devices. To keep the interaction simple, one embodiment provides a method to select objects from a group that is quick and that concatenates seamlessly with the stitching gesture. This method has the same footprint regardless of the number of objects selected (i.e. one, some, many, or all). It should be noted that many and all are the dual cases for some and none.

Figure 19:
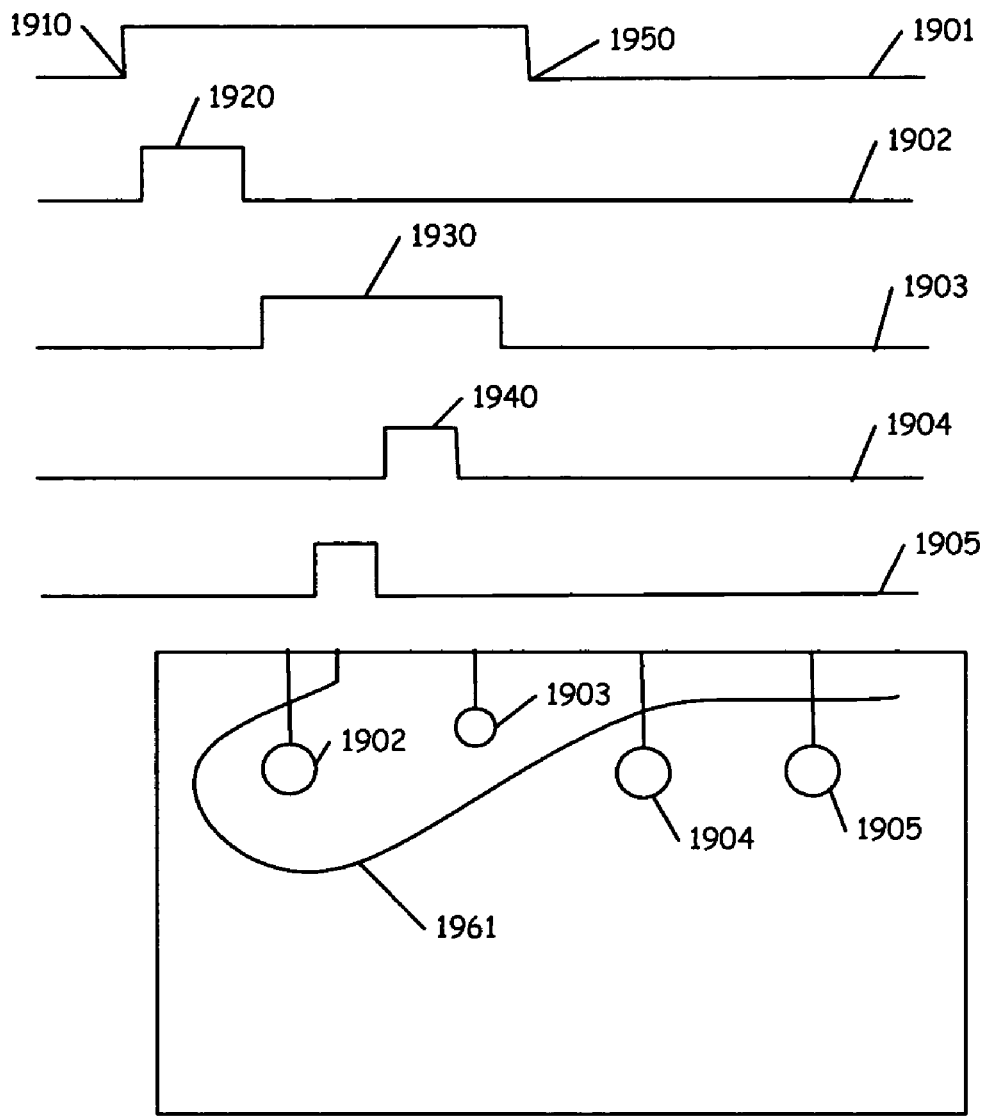
FIG. 19 is a diagrammatic illustration of the process for accepting or rejecting connections.

The connection sequence for cooperative stitching can in one embodiment continue fluidly by adding a post-selection task. For example, a user that initiates a connection can choose, by using for example a crossing gesture, which of the users that accepted connections will be finally accepted or rejected. This example is illustrated in FIG. 19. In other embodiments, the crossing or other gestures may be drawn separately from the stitch itself.

FIG. 19 illustrates the selection of participants according to one embodiment. At 1910 the user 1901 opens an invitation to join the group. Users 1902, 1903, 1904 join the group at 1920, 1930, and 1940. At 1950 the initiating user closes the invitation. Once the invitation has been closed the initiating user 1901 decides which of the users 1902, 1903, and 1904 are to be allowed to join. User 1901 can draw a line 1961 on display such that users 1902 and 1904 can join, but user 1903 cannot. In the embodiment illustrated in FIG. 19 this selection is made by crossing a line associated with each user with line 1961. However, other methods can be used. The crossing approach is well suited for this kind of selection task, since it allows users to quickly select all, some, or none of the connections. In an alternative embodiment the selection task can be made more explicit by adding a binary selection that lets user 1901 choose between accepting and canceling the selected connections. Finally, a timeout can be provided that triggers a default behavior if user 1901 fails to act.

Figure 20:
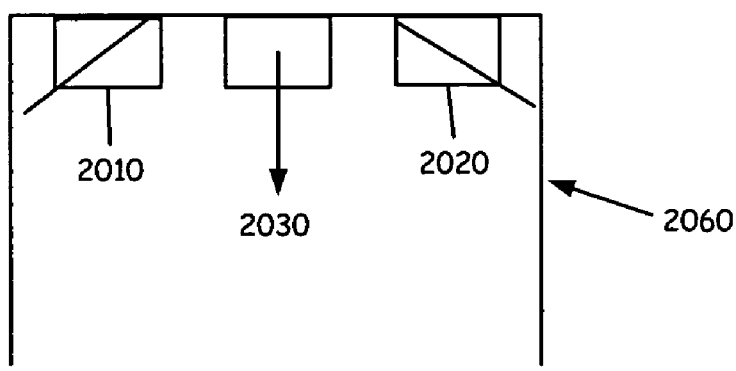
FIG. 20 is a diagrammatic illustration of an alternative process for accepting or rejection connections.

However, there may be instances where due to a large number of connections an entire edge of screen 1960 is full with tabs or other indications making the above describe crossing techniques difficult. In these instances it may be desirable to review each connection individually. FIG. 20 provides an illustration of one alternative approach to selecting or rejection connections. In this example the user 2001 can reject connections by crossing out the connection as shown at 2010 and 2020. The user 2001 can accept the connection by pulling a line 2030 towards the center of display 2060.

Figure 21:
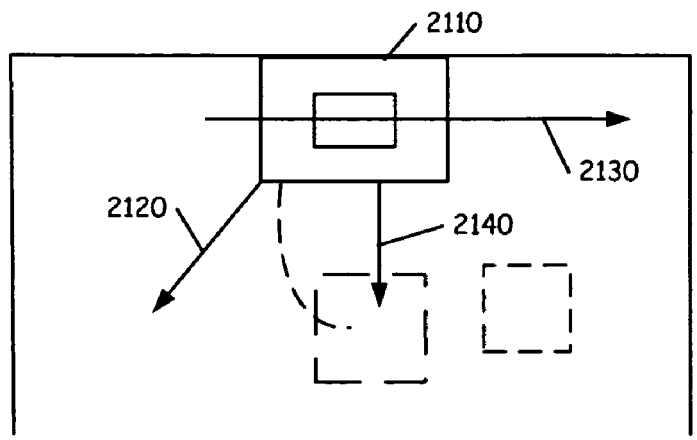
FIG. 21 is a diagrammatic illustration of a process for accepting or rejection an item received over a synchronous connection.

The main difference between this approach and the one of FIG. 21 is that the gesture is broken down in several strokes. The present embodiments provide a benefit to users in knowing who they accepting connections from, and what it is that the user accepting to decide if they want the connection to be established. FIG. 21 illustrates a possible instantiation of these interactions.

FIG. 21 illustrates a receiver's point of view according to one embodiment. After receiving something from a sender, as indicated at 2110 the user has the option of bouncing the item back to the sender, or terminating the connection. Returning to the sender is illustrated at 2120. The termination of the correction is illustrated at 2130. Even though the final result of the actions of 2120 and 2130 are the same, there are some slight conceptual differences between actions 2120 and 2120. In action 2120 the user rejects an item, while in action 2130 the user rejects a sender. Such distinction can be important depending on the type of connection established. The types of connections will be described later.

Connections can be classified in two groups: transient and permanent. Transient connections are usually casual and are typically bounded by the time it takes to transmit a piece of data/information from one location to one or more destinations. In contrast permanent connections are longer and define channels through which data/information can flow between two or more devices. There are a number of scenarios where these set interactions may be applicable. For example, in a meeting someone desires to distribute a document for all to see, or work on. There are a number of variations for this situation. 1) One shares a link to a presentation other device to see or work with. 2) Other users displays can become surrogates displays of the "initial" device, where users still have control over their screen. e.g. to make annotations. 3) A copy of a document is distributed, allowing individual changes by each participant. These documents can then be resent for later merging on the initiating device.

In a second example, in a meeting a participant distributes resources/information from a pool or repository. This can be exemplified by thinking of the process as a "dealing of cards", where the "dealer" offers information, and the "players" accept a different piece of information or "card" each, for example when a large problem or document is partitioned and distributed to several people in order to solve the various sub-problems concurrently. As another example, one could distribute different photos from a single folder to the various participants.

Figure 22:
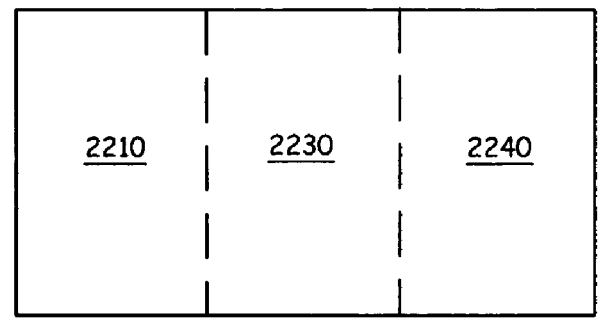
FIG. 22 is a diagrammatic illustration of one embodiment dividing a display into various areas to define the accessibility to an item.

In a third example, a shared space is created, where all the displays become part of a larger work area as analogous to an overhead projector or large display screen. In this example more "semi-permanent" connection is established, as opposed to the more casual, transient case, described above. Such a semi-permanent shared space can in various embodiments be subject to a subdivision of each screen or device into private/public spaces. For example, In FIG. 22 a configuration in which users have a certain type of access on particular areas of the devices is illustrated according to one embodiment In FIG. 22 the leftmost area 2210 is designated as a public area, for those devices that are connected to it, and the middle area 2230 is designated a semi-public (read only) area for all devices connected to it, and the right most area 2240 is designated a private area where information is local to that device and not shared with any other device.

In a fourth example a number "wormholes" are generated for future data sharing. This results in the creation of a more "permanent" connection, however its presence is more subtle than the third example above. Instead of relying on designations of areas for data sharing, users interact by using one-way or two-way "wormholes" or connections located on their devices. In this example with this mode of operation it is possible to have embodiments in which there is a physical layout or configuration and a virtual (logical) one, as indicated by the "wormholes."

In all of these examples, any and all users who participate in the connection between a subset of devices can choose to terminate their connection to the other system(s) at any time, or disable one or more connections temporarily or permanently.

The present embodiments consider three types of interactions or gestures for cooperative stitching in the above examples of a collaboration and connection scenarios.

Fast stitch: This is similar to the simple stitching gestures described earlier in this document, but includes multiple participants instead of the single participant of the simple stitch. This fast stitch is fast, has minimal feedback, and relies a great deal on social protocol and other social cues in order for users to complete it successfully. In this approach the use of social protocol is possible because the participants are in a collocated setting. In other words, a person knows that someone will connect with them because that person will tell them so. The person can do this by using explicit words or body language. Therefore, it is possible to both recover from a connection that was not successful, and to avoid unwanted participants as the physical gesture and other social communication goes unseen by unwanted parties who are not co-located. Finally, the gesture can be made more secure by adding an authorization stage at the transmission and/or receiving ends.

Figure 23:
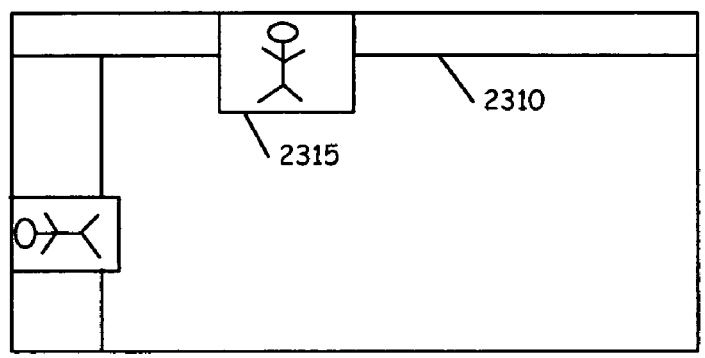
FIG. 23 is an illustration of one approach to communicating with others via the connections.

Stitch with hold: This approach was mentioned above with regards to FIG. 19. The time of this gesture is bounded by the duration of a "connection offer" made by the transmission side by holding the stylus or other pointing devices at the edge of the screen. Unlike fast stitching, this gesture can both use (graphical) feedback and/or social protocol to make participants aware that a connection is being offered. In some embodiments, the initial feedback in this gesture responds to a broadcast signal that is sent to all the devices that are in the desired areas. FIG. 23 illustrates the form this feedback for broadcast can take according to one embodiment.

In FIG. 23 a whole edge 2310 becomes highlighted to illustrate to the user that a connection can be made by grabbing from any point in the edge 2310 and not only from the tab 2315. Also, in various embodiments the edge 2310 can provide extra information about who (with what device) is making the connection. Furthermore, by having a single broadcast feedback occupy only one edge, a device could deal with four or more simultaneous requests at a time: depending on the configuration additional connection requests could be shown.

In alternative embodiments a much looser stitching can use broadcasting combined with a electronic mailbox. This allows asynchronous connections for users that do not want to respond to every incoming connection, stitch, or broadcast within the time frame of a particular synchronous gesture. In this embodiment messages or incoming connections accumulate on an inbox space, web site, or other electronic forum that the user can consider immediately or at a later time. This approach is discussed further later in this document.

Information Channels/Wormholes/Shared Spaces

The above approaches to stitching cover transient connections where the gesture includes both the data to be transmitted, and the specification of the recipient. The "wormhole" (introduced above) is another embodiment of stitching that can create a more permanent connection or link between devices. This link can be used to transmit information back and forth at a later time. This type of persistent connection between two or more devices allows for a way of information sharing that is easy, fluid and does not violate the users'personal space. This type of persistent connection can be seen by people in several ways, and can be arranged in two groups.

Figure 24:
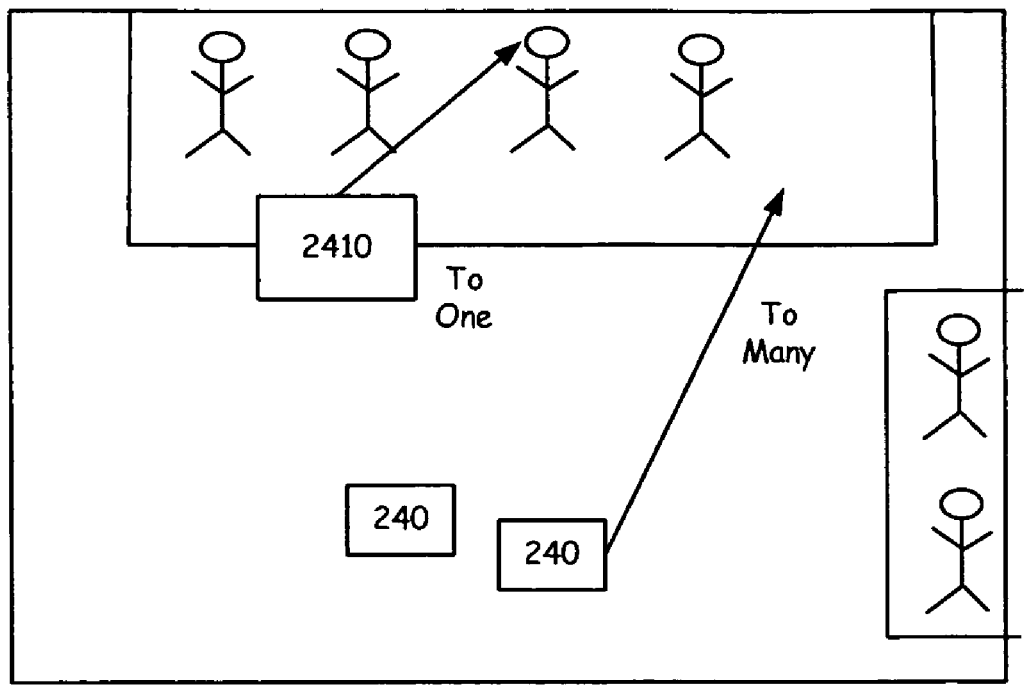
FIG. 24 is a diagrammatic illustration of a display in a user centric environment.

The first is a user-centric connection which sees every device/user as a portal where information arrives or can be sent. This is illustrated by FIG. 24. One can use any of the previous stitching techniques to create this transporter pad 2410 or zone, which is a region that contains a number of iconic representations of the possible destinations reachable from a connected device. Many of these zones 2410 can co-exist on the same device, each zone defining a particular group that can be reached by normal drag-and-drop operations. Also in alternative embodiments it is possible to move icons representing connections to each user to fit the needs of the user. Thus, it is possible to see the zones as maps, similar to the drawings people may create in meetings in order to remind themselves of the attendees and their physical location around a table. Note that in this case the primary benefit of stitching is to make it easy to create these initial connections, but thereafter traditional drag-and-drop techniques can be used to share information.

Figure 25:
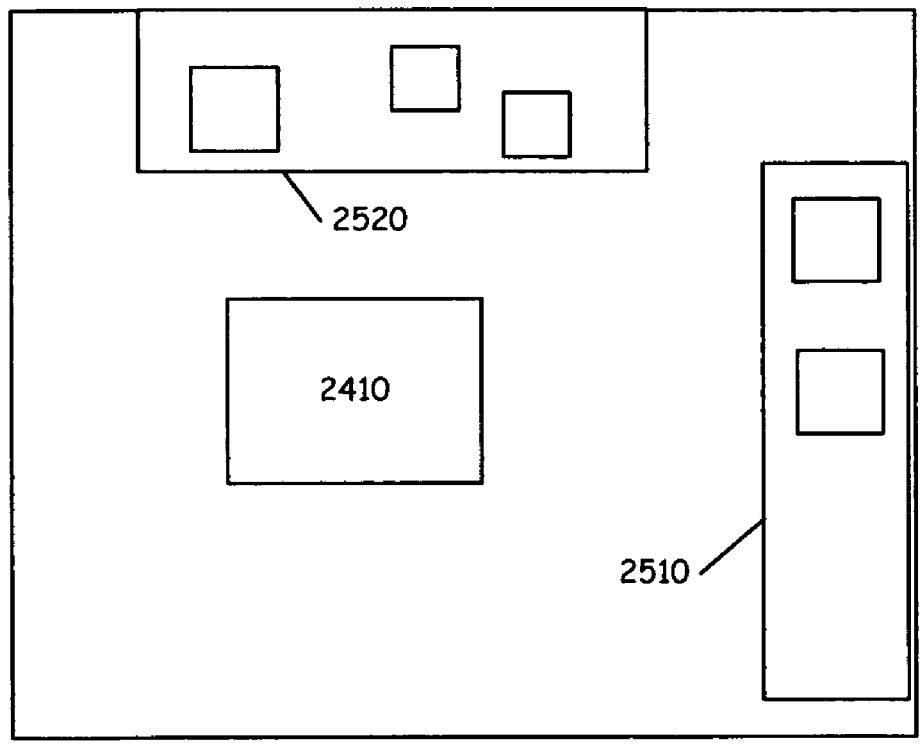
FIG. 25 is a diagrammatic illustration of a display in a data centric environment.

The second is a data-centric connection where information "comes out" of a particular device/user, in what can be seen as a disruptive behavior. There are many scenarios where users do not want to be disturbed from the task they are presently performing while information is being sent to them. In a variation from the "inbox" metaphor, it is also possible to have these data-centric zones to act as shared spaces that different groups of people use to collaborate by adding or removing information. FIG. 25 illustrates a display in the data-centric approach according to the embodiments.

Multi-Device Stitching and Bumping

Both Stitching and Bumping can be extended to connecting more than two devices. For example, a connection technique can be implemented using multiple pairwise stitches or pairwise bumping. Other connection techniques can also be employed. One design property is that it should be easy to add or remove individual devices as users come and go. Multiple pairwise stitches naturally support this.

For some of the glyph-type gestures (e.g., FIG. 10-2), it may be hard for the user to mentally rotate them to occur in the vertical direction. A simple linear stitch does not have this problem.

Figure 26:
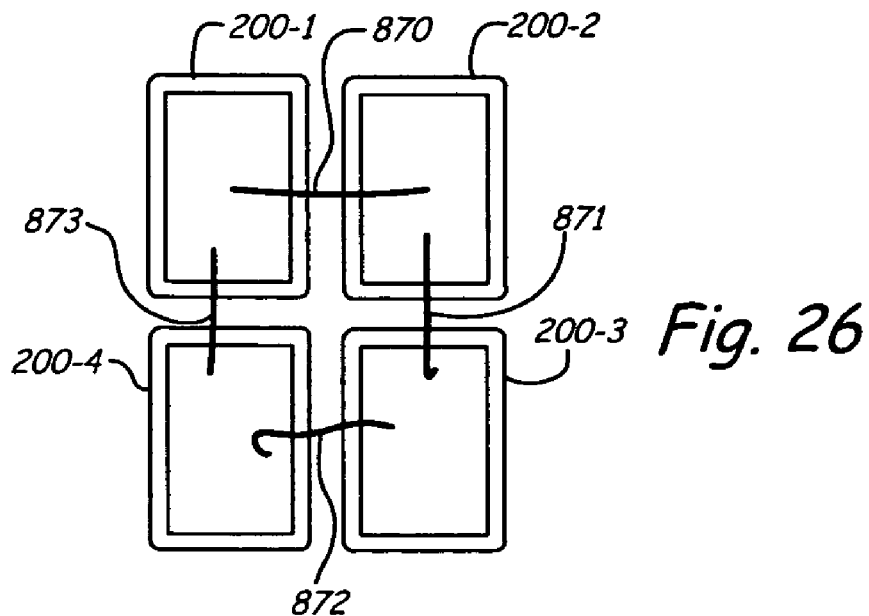
FIGS. 26 through 28 are diagrammatic illustrations of stitching type synchronous gestures and related tasks or features.
Figure 27:
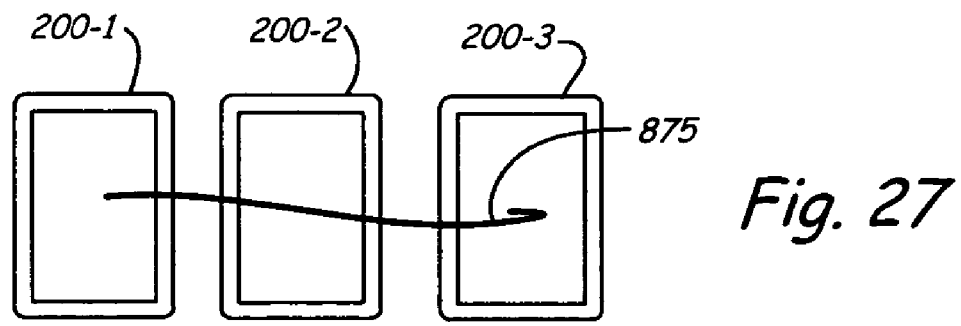
Figure 28:
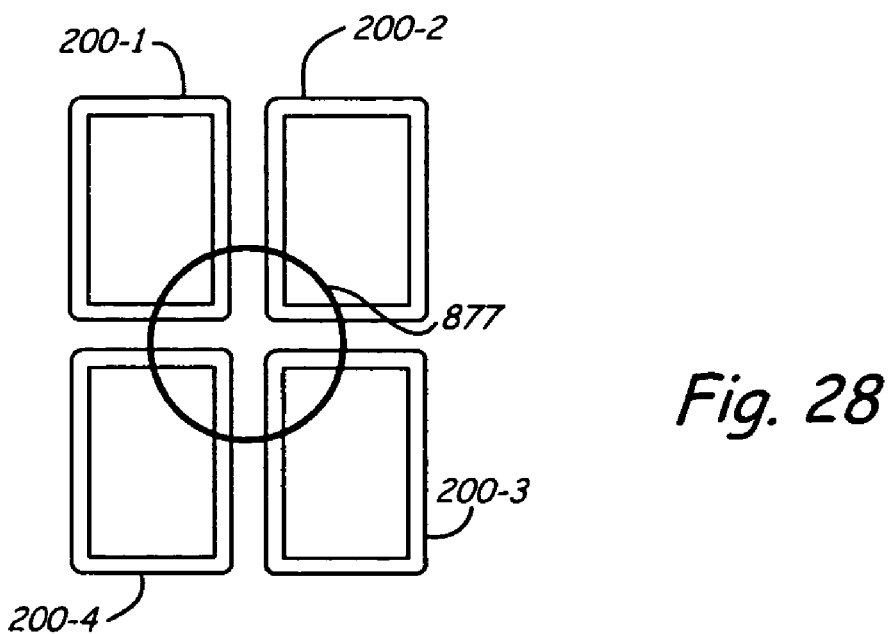

In FIG. 26, four tablets or mobile devices 200-1 through 200-4 are shown stitched together with individual stitches 870-873 between pairs. Here, the final "stitch" 873 back to the first mobile device 200-1 is inferred from the structure. In FIG. 27, three mobile devices 200-1 through 200-3 are stitched together with a single "long stitch" 875. In FIG. 28, four mobile devices 200-1 through 200-4 are stitched together using a circle stitch or gesture 877.

Similarly, with bumping, a row of several devices may all sense a "bump" signal from a single new device added onto the end of the row, since the force is transmitted through the devices. This can be used to connect together all devices in a single gesture analogous to the long stitch. If the devices are connected in pairs, this signal has to be filtered to figure out which device the new device actually struck. This can be achieved by considering the topology of already-connected devices when a new device joins.

Stitch Recognition

Various algorithms and techniques can be used in stitch recognition. For example, the algorithms can use "time-outs" between the pen leaving proximity on one screen and entering proximity on another. Also, the direction and velocity of pen motion can be sensed. In other embodiments, the tilt angle of the pen could be sensed to increase robustness and content. If a unique pen ID is available, this can also be used; but unlike Pick and Drop, systems of some embodiments of the various embodiments use the pen ID in combination with the time-stamped pen coordinates to calculate direction, velocity, etc. to help ensure that the user's motion represents an intentional gesture intended to connect two computers, rather than a simple pointing movement that may happen to occur as the result of talking to another user while pointing at the screen with the pen, or incidental to one user his pen to perform an action on another user's pen, as this may not in itself convey a desire to transfer information between the devices.

In some embodiments, a Kalman filter or other predictive mathematical model of the input device's trajectory predicts the second half of a trajectory from the observed data in the first half of a trajectory. If the second half of a gesture matches the predicted trajectory, it increases the confidence of the recognition.

Pen ID vs. Stitching

Even if a unique ID exists for each pen or stylus, stitching remains a relevant and useful tool, for example for the following reasons:

Stitching provides the command semantics, parameters, and operands; Pen ID identifies the cursor as coming from a particular pen.

Stitching does not require a unique ID to recognize a unitary act with the pen that spans two devices. Hence it is possible to implement Pick+Drop-like interactions on devices that do not support unique ID. For example, no commercially available Tablet PC's or Pocket PC's currently support a Pen ID feature.

With stitching interfaces we consider features and capabilities not considered by Pick+Drop, such as the possibility to combine two screens in multiple different ways, and to automatically calibrate the spatial relationship between two screens.

PenID still has the issue of inadvertent interaction with the other user's screen (e.g. pointing to that user's screen while talking). Is the user pointing, or trying to link together the two screens?

Stitching recognition could be more robust with PenID: i.e., there would be no doubt that a movement represented a continuation of a movement that began on another screen, since the ID of the pen would be verifiable on each device. In embodiments without PenID, the timing and dynamics of the movement are relied upon to infer this.

Hence, PenID and Stitching complement one another. It is not necessary to use pen IDs in order to implement and foster a collaboration space that spans multiple pen-aware devices. However, this doesn't mean that there are no advantages to be gained by being able to access Pen IDs, i.e. being able to elucidate undoubtedly the identity of a user behind an interaction.

Stitching Between Heterogenous Devices

Stitching provides a compelling way to create casual connections between devices that support pen interaction, but have distinctive differences. A list of such devices includes TabletPCs, PocketPC, PDAs, (digital) whiteboards and desktops. However, this list is not exhaustive, since any device that has a pointing device can potentially support stitching operations.

The ability to create connections between heterogeneous devices is necessary and important not only because different users possess different types of devices, but also because different devices can act as intermediaries or as "neutral territory" where collaboration among people can occur without concerns about privacy, or the violation of one's personal space. Also, very mobile devices (a PDA vs. a Laptop vs. a Desktop vs. a Wall) can act effectively as a transport to take or bring information from one source to another.

However, the use of (personal) small devices as intermediaries can still make people feel uncomfortable about giving away their personal PDA (or smart phone) across a room, especially if the PDA contains that person's phone book, calendar, photos or other personal information. In one embodiment it is possible to enable a special mode in the device that transforms it into an enhanced "media container", or "visual drive". Unlike a blind memory container (such as a USB key), where in order to see the information that is contained on the device one has to plug it in to a computer, a visual container allows one or many people at the same time to see what is inside and directly choose what is wanted by using stitching. However, other formats can be used.

Stitching and Calibration

Stitching provides enough geometric information to align or "calibrate" the participating device's displays. Our initial discussion of calibration assumed constant size, form factor and dots-per-inch screen resolution (dpi) across devices. We now describe how to achieve such calibration for arbitrary devices in any relative orientation. In the embodiment described below, the nearest 90 degree rotation can be used. In other embodiments, continuous orientation (any relative angle between devices) can be calculated.

One approach is to generalize calibration is based on two principles that greatly simplifies the math involved: Thus, a) Various embodiments work in physical units. That is, instead of using pixel coordinates they operate in millimeters, or inches. By doing this, it is possible to provide correct alignment information across devices with different characteristics. In order to do this we need the dpi information for the participating displays.

b) The mathematics for the various embodiments assume the machine that receives the stitch (Rx) is always right of the machine where the stitch starts (Tx). By doing this the mathematical expressions only need to consider one orientation case, for which the math is well known. This assumption does not restrict the actual arrangements of devices that we can use these expressions to calibrate for.

Once conditions a) and b) above are met we are able to translate to and from any of the participating devices coordinate systems. For example, to transform back and forth points from Rx's device coordinate to Tx's device coordinates:

$$P \to Rotate_{rx}(P) \to Scale_{rx}(Rotate_{rx}(P)) \to$$
$$Calibrate(Scale_{rx}(Rotate_{rx}(P))) \to$$
$$Scale_{tx}^{-1}(C(S_{rx}(R_{rx}(P)))) \to$$
$$Rotate_{tx}^{-1}(S_{tx}^{-1}(C(S_{rx}(R_{rx}(P))))) =$$
$$P_{tx} \equiv \text{as seen by } Tx$$

Equation 2

Each transformation according to one embodiment works as follows:

Rotate: rotate the coordinates 90, 180 or 270 degrees depending on the edge the stitch is coming from or going through. The system adjusts the corresponding dots-per-inch scaling factors (DPI's) according to the rotation.

Scale: Apply DPI's for each coordinate from the appropriate device.

Calibrate: Follong from condition b) above, the calibration calculation can now be written, for the transmitting device, as:

$$X_{tx} = txSpan + txBezel + x \uparrow \text{ in mm/inches}$$

Equation 3

$$y + x = y - rxDisplacement$$

And for the receiving device, $$x_{rx} = -(txspan - x) - (txBezel + rxBezel) \uparrow \text{ in mm/inches}$$

Equation 4

$$y_{rx} = y + rxDisplacement$$

These calculations depend on the value "rxDisplacement", which is computed as follows:

$$rxDisplacement = PB \cdot y - PA \cdot y$$

Equation 5

$$PB \cdot y = (txBezel + rxBezel) \tan\left(\frac{txAngle + rxAngle}{2}\right)$$

$$PB \cdot y = PC \cdot y + (txBezel + rxBezel) \tan\left(\frac{txAngle + rxAngle}{2}\right)$$

Where, as shown in FIG. 10-6, PA is the intersection of the extension of txP1 along txAngle with the edge; and PC is the intersection of the extension of rxP0 along rxAngle with the edge.

Although the various embodiments have been described with reference to preferred embodiments, workers skilled in the art will recognize that changes may be made in form and detail without departing from the spirit and scope of the various embodiments. For example, while some embodiments are described specifically with respect to tablet computing devices, the various embodiments can be used with other mobile computing devices as well, or even use permanently fixed large display surfaces or pointing devices for traditional LCD or CRT displays. As a second example, while some embodiments of the various embodiments are described with reference to detecting proximity of a stylus to the mobile computing device, one of skill in the art will understand that detecting proximity of the stylus relative to the mobile computing device includes detecting contact between the stylus, finger, or other pointing device and a display surface that senses or can be sensed by that device.

What is claimed is:

1. A method of coordinating resources between at least two computing devices, the method comprising:

initiating a resource coordination connection between a first device and at least one other device by initiating a first stitching gesture at the first device, the first device and at least one other device comprising computing devices;

receiving the first stitching gesture at the at least one other device and accepting the connection at the at least one other device, wherein accepting the connection comprises performing a second stitching action on the at least one other device while the first gesture is active at the first device;

performing an authorization inquiry with respect to the at least one other device that has accepted the connection, wherein performing comprises performing an action on the first device to authorize the connection between the first device and the at least one other device that has accepted the connection to consummate the coordination of resources between the first device and the at least one other device, wherein the performing an action on the first device to authorize the connection comprises using a crossing gesture at the first device to select whether the at least one other device that has accepted the connection is validated for stitching; and coordinating the resources based upon the performed action using a processor of at least one of the first device and the at least one other device.

2. The method of claim 1 further comprising:
receiving an indication at the first device of the second stitching gesture performed by the at least one other device that has accepted the connection.

3. The method of claim 2, and further comprising:
prior to coordinating resources, determining if resources are to be coordinated between the first device and the at least one other device that has accepted the connection.

4. The method of claim 3 wherein determining comprises:
allowing a resource to be coordinated between the first device and the at least one other device that has accepted the connection; and
disallowing a resource to be coordinated between the first device and the at least one other device that has accepted the connection.

5. The method of claim 1 wherein the first gesture is active for a period of time.

6. The method of claim 5 wherein the period of time is predetermined.

7. The method of claim 5 wherein initiating the first stitching gesture comprises:
performing an action on a display device of the first device; and
wherein the period of time corresponds to a period of time of the action.

8. The method of claim 7 wherein performing the action on the display device of the first device comprises:
using a pointing device on the display device to initiate the first gesture, wherein the period of time of the action on the display device comprises a period of time during which the pointing device is held over a predetermined area of the display device.

9. The method of claim 1, wherein the at least one other device comprises a second device that has accepted the connection, and further comprising:
creating a resource coordination connection between the second device that has accepted the connection and a third device.

10. The method of claim 9 wherein creating the resource coordination connection comprises:
initiating a third stitching gesture at the second device that has accepted the connection;
receiving the third gesture at the third device;
performing an action on the third device to consummate the coordination of resources between the second device and the third device, while the first gesture is active; and
coordinating resources based upon the performed actions.

11. The method of claim 10 further comprising:
defining a level of coordination between each of the devices.

12. The method of claim 11 wherein the level of coordination develops a worm hole link between the devices.

13. The method of claim 11 wherein the level of coordination uses a buffer to manage resource coordination.

14. The method of claim 13 wherein the second device that has accepted the connection uses the buffer.

15. A computer readable storage medium containing computer executable instructions that, when executed, cause a computer to perform a method comprising:
initiating a connection between a first device and a second device;
accepting the connection at the second device;
performing an authorization inquiry with respect to the second device that has accepted the connection, wherein performing comprises performing an action on the first device to authorize the connection between the first device and the second device that has accepted the connection, wherein the performing an action on the first device to authorize the connection comprises using a crossing gesture at the first device to select whether the second device that has accepted the connection is validated for stitching;
initiating a first stitching gesture at the first device and transmitting the first stitching gesture from the first device to the second device while the first gesture remains active on the first device;
receiving an indication from the second device that has accepted the connection indicating that the first stitching gesture was accepted, wherein the indication from the second device indicates that the first stitching gesture was accepted by the second device while the first gesture is active; and
coordinating resources between the first device and the second device that has accepted the connection using a processor of at least one of the first device and the second device.

16. The computer readable storage medium of claim 15, wherein the method further comprises:
selecting a number of accepted connections to coordinate resources.

17. The computer readable storage medium of claim 16 wherein selecting comprises receiving a stylus input on a display of the first device.

18. The computer readable storage medium of claim 15, wherein the method further comprises:
holding the first gesture open for a period of time.

19. The computer readable storage medium of claim 18 wherein the first gesture is transmitted while a stylus is held down on a portion of a display device on the first machine.

* * * * *